United States Patent
Lee et al.

(10) Patent No.: US 10,956,485 B2
(45) Date of Patent: *Mar. 23, 2021

(54) RETARGETING IN A SEARCH ENVIRONMENT

(71) Applicant: GOOGLE LLC, Mountain View, CA (US)

(72) Inventors: Wei-Hsin Lee, Saratoga, CA (US); Jacob D. Schonberg, San Francisco, CA (US); Chiu Wah Kelvin So, Mountain View, CA (US); Jianfeng Shen, San Jose, CA (US); Gaurav Bhaya, Sunnyvale, CA (US); Robert Stets, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 15/590,861

(22) Filed: May 9, 2017

(65) Prior Publication Data
US 2018/0232371 A1 Aug. 16, 2018

Related U.S. Application Data

(63) Continuation of application No. 15/395,725, filed on Dec. 30, 2016, now Pat. No. 10,630,751, and a
(Continued)

(51) Int. Cl.
*G06F 16/00* (2019.01)
*G06F 16/48* (2019.01)
*G06F 16/432* (2019.01)

(52) U.S. Cl.
CPC ............ *G06F 16/48* (2019.01); *G06F 16/433* (2019.01)

(58) Field of Classification Search
CPC .............................. G06F 16/95; G06F 16/335
See application file for complete search history.

(56) References Cited

U.S. PATENT DOCUMENTS

| 4,603,430 A | 7/1986 | Sacks |
| 5,542,107 A | 7/1996 | Kay |

(Continued)

FOREIGN PATENT DOCUMENTS

| CA | 2633177 A1 | 12/2009 |
| CN | 101410815 | 4/2009 |

(Continued)

OTHER PUBLICATIONS

Buckland et al., "Amazon's Alexa Takes Open-Source Route to Beat Google Into Cars", Bloomberg, Feb. 27, 2018 (6 pages).
(Continued)

*Primary Examiner* — Hung Q Pham
(74) *Attorney, Agent, or Firm* — Foley & Lardner LLP

(57) ABSTRACT

Methods, systems, and apparatus, including computer programs encoded on a computer storage medium, for retargeting content in a search environment. A method can include receiving a request for a content item to be provided with a search results page and determining that one or more retargeted content items are eligible for presentation with the search results page. Each retargeted content item is a content item that is eligible for presentation with the search results page based on: (1) the search query matching a targeting keyword for the retargeted content item, and (2) the user identifier matching a retargeted identifier that is included in a retargeting set for the retargeted content item. A responsive content item to be presented with the search results page is selected, based at least in part on bids that are associated with the retargeted content items, and data specifying the responsive content item are provided.

20 Claims, 9 Drawing Sheets

Related U.S. Application Data continuation-in-part of application No. 15/361,668, filed on Nov. 28, 2016, now Pat. No. 10,102,545, which is a continuation of application No. 14/870,725, filed on Sep. 30, 2015, now Pat. No. 9,530,153, which is a continuation of application No. 14/176,845, filed on Feb. 10, 2014, now Pat. No. 9,177,329, which is a continuation of application No. 13/222,380, filed on Aug. 31, 2011, now Pat. No. 8,650,188.

(56) References Cited

U.S. PATENT DOCUMENTS

| | | |
|---|---|---|
| 5,581,686 A | 12/1996 | Koppolu et al. |
| 5,608,727 A | 3/1997 | Perreault et al. |
| 6,275,806 B1 | 8/2001 | Pertrushin |
| 6,684,249 B1 | 1/2004 | Frerichs et al. |
| 6,771,390 B1 | 8/2004 | Weidlich |
| 6,857,007 B1 | 2/2005 | Bloomfield |
| 7,003,729 B1 | 2/2006 | Rajala et al. |
| 7,219,309 B2 | 5/2007 | Kaasila et al. |
| 7,222,306 B2 | 5/2007 | Kaasila et al. |
| 7,337,392 B2 | 2/2008 | Lue |
| 7,853,255 B2 | 12/2010 | Karaoguz et al. |
| 7,865,404 B2 | 1/2011 | Peckover |
| 7,877,696 B2 | 1/2011 | Telek et al. |
| 7,900,137 B2 | 3/2011 | Ivarsoy et al. |
| 7,925,138 B2 | 4/2011 | Ando et al. |
| 7,962,522 B2 | 6/2011 | Norris, III |
| 7,964,841 B2 | 6/2011 | Imai |
| 8,151,183 B2 | 4/2012 | Chen et al. |
| 8,195,133 B2 | 6/2012 | Ramer et al. |
| 8,208,788 B2 | 6/2012 | Ando et al. |
| 8,265,220 B2 | 9/2012 | Komaili et al. |
| 8,302,000 B2 | 10/2012 | Uehori |
| 8,386,386 B1 | 2/2013 | Zhu |
| 8,402,379 B2 | 3/2013 | Barak |
| 8,413,070 B1 | 4/2013 | Castrucci et al. |
| 8,448,074 B2 | 5/2013 | Forutanpour et al. |
| 8,453,051 B1 | 5/2013 | Weiss et al. |
| 8,510,237 B2 | 8/2013 | Cascaval et al. |
| 8,756,523 B2 | 6/2014 | Chiba et al. |
| 8,903,716 B2 | 12/2014 | Chen et al. |
| 8,914,753 B2 | 12/2014 | Miyata |
| 8,938,672 B2 | 1/2015 | Desantis et al. |
| 9,014,483 B2 | 4/2015 | Ito et al. |
| 9,164,966 B1 | 10/2015 | Llach et al. |
| 9,183,319 B2 | 11/2015 | Joel et al. |
| 9,357,075 B1 | 5/2016 | Kloberdans et al. |
| 9,542,956 B1* | 1/2017 | Nostrant ............... G10L 21/00 |
| 9,703,757 B2 | 7/2017 | Rimmer et al. |
| 10,431,209 B2 | 10/2019 | Bhaya et al. |
| 2001/0016034 A1 | 8/2001 | Singh et al. |
| 2002/0178005 A1 | 11/2002 | Dusan et al. |
| 2003/0023656 A1 | 1/2003 | Hutchison et al. |
| 2004/0056894 A1 | 3/2004 | Zaika et al. |
| 2004/0098251 A1 | 5/2004 | Vainio et al. |
| 2004/0141016 A1 | 7/2004 | Fukatsu et al. |
| 2004/0177316 A1 | 9/2004 | Layzell et al. |
| 2005/0060709 A1 | 3/2005 | Kanai et al. |
| 2005/0086345 A1 | 4/2005 | Philyaw et al. |
| 2006/0103667 A1 | 5/2006 | Amit et al. |
| 2006/0242017 A1 | 10/2006 | Libes et al. |
| 2006/0253796 A1 | 11/2006 | Wang et al. |
| 2007/0005433 A1 | 1/2007 | Lee et al. |
| 2007/0019549 A1 | 1/2007 | Okabe |
| 2007/0097975 A1 | 5/2007 | Rakers et al. |
| 2007/0118797 A1 | 5/2007 | Layzell |
| 2007/0127688 A1 | 6/2007 | Doulton |
| 2008/0037656 A1 | 2/2008 | Hannuksela |
| 2008/0114747 A1 | 5/2008 | Goller et al. |
| 2008/0147388 A1 | 6/2008 | Singh |
| 2008/0235574 A1 | 9/2008 | Telek et al. |
| 2009/0085921 A1 | 4/2009 | Do et al. |
| 2009/0132578 A1 | 5/2009 | Parikh et al. |
| 2009/0183065 A1 | 7/2009 | Endo et al. |
| 2009/0279108 A1 | 11/2009 | Hoshi et al. |
| 2009/0300120 A1 | 12/2009 | Schmidt |
| 2009/0327032 A1* | 12/2009 | Gunawardana ........ G06Q 30/02 705/14.42 |
| 2010/0011316 A1 | 1/2010 | Sar et al. |
| 2010/0082780 A1* | 4/2010 | Muilenburg .......... G06F 16/958 709/221 |
| 2010/0199209 A1 | 8/2010 | Sueoka et al. |
| 2010/0199210 A1 | 8/2010 | Harada et al. |
| 2010/0199211 A1 | 8/2010 | Igawa et al. |
| 2010/0325430 A1 | 12/2010 | Denninghoff |
| 2011/0093605 A1 | 4/2011 | Choudhury et al. |
| 2011/0258562 A1 | 10/2011 | Zhu et al. |
| 2012/0060111 A1 | 3/2012 | Kim |
| 2012/0158490 A1 | 6/2012 | Neumeyer et al. |
| 2012/0159314 A1 | 6/2012 | Schrier et al. |
| 2012/0165009 A1 | 6/2012 | Oba et al. |
| 2012/0265528 A1 | 10/2012 | Gruber et al. |
| 2013/0007602 A1 | 1/2013 | Dougherty et al. |
| 2013/0021377 A1 | 1/2013 | Doll |
| 2013/0024757 A1 | 1/2013 | Doll et al. |
| 2013/0089098 A1 | 4/2013 | Mital et al. |
| 2013/0117022 A1 | 5/2013 | Chen et al. |
| 2013/0174047 A1 | 7/2013 | Sivakumar et al. |
| 2013/0275164 A1 | 10/2013 | Gruber et al. |
| 2013/0298085 A1 | 11/2013 | Kritt et al. |
| 2013/0304758 A1 | 11/2013 | Gruber et al. |
| 2013/0305144 A1 | 11/2013 | Jackson et al. |
| 2013/0305145 A1 | 11/2013 | Jackson et al. |
| 2014/0033228 A1 | 1/2014 | Lucash |
| 2014/0108941 A1 | 4/2014 | Joel et al. |
| 2014/0180796 A1 | 6/2014 | Sas et al. |
| 2014/0258849 A1 | 9/2014 | Chung et al. |
| 2014/0281918 A1 | 9/2014 | Wei et al. |
| 2015/0019957 A1 | 1/2015 | Ying et al. |
| 2015/0066479 A1 | 3/2015 | Pasupalak et al. |
| 2015/0088970 A1 | 3/2015 | Wei et al. |
| 2015/0095768 A1 | 4/2015 | Rimmer et al. |
| 2015/0242908 A1 | 8/2015 | Kobyakov et al. |
| 2015/0350598 A1 | 12/2015 | Yang et al. |
| 2015/0379670 A1 | 12/2015 | Koker et al. |
| 2016/0092699 A1* | 3/2016 | Riva ..................... H04L 67/306 726/26 |
| 2016/0274864 A1 | 9/2016 | Zomet et al. |
| 2016/0308981 A1 | 10/2016 | Cortes Gomez |
| 2016/0357717 A1 | 12/2016 | Metz et al. |
| 2017/0068423 A1 | 3/2017 | Napolitano et al. |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0169817 A1* | 6/2017 | VanBlon ................ G10L 15/02 |
| 2017/0250936 A1 | 8/2017 | Rosenberg et al. |
| 2017/0300456 A1 | 10/2017 | Rimmer et al. |
| 2017/0315962 A1 | 11/2017 | Kovar |
| 2017/0358301 A1 | 12/2017 | Raitio et al. |
| 2018/0012595 A1 | 1/2018 | Weingartner |
| 2018/0190271 A1 | 7/2018 | Bhaya et al. |
| 2018/0191798 A1 | 7/2018 | Zhu et al. |

FOREIGN PATENT DOCUMENTS

| | | |
|---|---|---|
| CN | 105654950 | 6/2016 |
| CN | 106033476 A | 10/2016 |
| EP | 1 965 564 | 9/2008 |
| EP | 2 814 244 A1 | 12/2014 |
| JP | 2005-043959 | 2/2005 |
| JP | 2006-146939 A | 6/2006 |
| JP | 2006-519435 | 8/2006 |
| JP | 2009-512005 A | 3/2009 |
| JP | 2011-066623 | 3/2011 |
| JP | 2012-073863 A | 4/2012 |
| JP | 2014-132464 | 7/2014 |
| JP | 2014-531076 | 11/2014 |
| KR | 10-1045589 | 7/2011 |
| KR | 2014-0143768 A | 12/2017 |
| WO | WO-2004/084109 | 9/2004 |
| WO | WO-2011/065564 A1 | 6/2011 |
| WO | WO-2011/088053 A2 | 7/2011 |

(56) References Cited

FOREIGN PATENT DOCUMENTS

| WO | WO-2012/002351 A1 | 1/2012 |
|---|---|---|
| WO | WO-2014/014745 A2 | 1/2014 |
| WO | WO-2015/179510 A1 | 11/2015 |
| WO | WO-2016/054230 | 4/2016 |
| WO | WO-2016/111881 A1 | 7/2016 |

OTHER PUBLICATIONS

CN Office Action dated for Appl. Ser. No. 201480054057.8 dated Mar. 5, 2019 (30 pages).
CN Office Action for Appl. Ser. No. 201480054057.8 dated Aug. 30, 2018 (7 pages).
CN Office Action for Appl. Ser. No. 201480054057.8 dated Jan. 17, 2018 (41 pages).
Fiegerman, Seth, "Alexa, shut up: Raging Against the New Machines", CNN, Aug. 22, 2017 (6 paqes).
International Preliminary Report on Patentability for Appl. Ser. No. PCT/US2017/049780 dated Sep. 10, 2018 (7 pages).
International Search Report and Written Opinion for Appl. Ser. No. PCT/US2017/49766 dated Nov. 24, 2017 (11 pages).
Johnson, Khari, "Amazon's Alexa Wants to Learn More About Your Feelings", VentureBeat, Dec. 22, 2017 (4 pages).
JP Notice of Allowance for Appl. Ser. No. 2017-556886 dated May 27, 2019 (6 pages).
JP Office Action for Appl. Ser. No. 2016-545216 dated Aug. 13, 2018 (6 pages).
JP Office Action for Appl. Ser. No. 2017-556886 dated Feb. 8, 2019 (8 pages).
JP Office Action for Appl. Ser. No. 2017-556911 dated Feb. 25, 2019 (7 pages).
Koetsier, John, "This AI Can Recognize Anger, Awe, Desire, Fear, Hate, Grief, Love . . . By How You Touch Your Phone", Consumer Tech, Aug. 31, 2018 (4 pages).
KR Office Action for Appl. Ser. No. 10-2017-7031 379 dated Jan. 21, 2019 (7 pages).
KR Office Action for Appl. Ser. No. 10-2017-7031385 dated Feb. 21, 2019 (21 pages).
Liberatore, Stacy, "Now Alexa knows when you're angry: Amazon's virtual assistant will analyse emotions in user's voices", DailyMail.com, Jun. 13, 2016 (33 pages).
Medeiros, J. "Virtual Assistants Can Detect Your Bad Mood and Do Something About It", Voice Summit Blog, Dec. 1, 2018 (7 pages).
PCT International Preliminary Report on Patentability for Appl. Ser. No. PCT/US2017/049766 dated Mar. 13, 2019 (7 pages).
Roberston, Katie, "Amazon Bets on an Empathetic Alexa", The New York Times, Mar. 3, 2019 (3 pages).
Stackoverflow, "Is it possible for a thread to deadlock itself", 2010, Stackoverflow, accessed from: www.stackoverflow.com/questions/3493441/is-it-possible-for-a-thread-to-deadlock-itself (23 pages).
Stackoverflow, "What is deadlock", 2008, Stackoverflow, accessed from: www.stackoverflow.com/questions/34512/what-is-a-deadlock# (17 pages).
U.S. Notice of Allowance for U.S. Appl. No. 15/361,668 dated Jun. 14, 2018 (5 pages).
U.S. Notice of Allowance for U.S. Appl. No. 15/361,668 dated May 7, 2018 (5 pages).
U.S. Notice of Allowance for U.S. Appl. No. 15/395,694 dated Dec. 10, 2018 (8 pages).
U.S. Notice of Allowance for U.S. Appl. No. 15/395,694 dated Jun. 18, 2019 (8 pages).
U.S. Notice of Allowance for U.S. Appl. No. 15/395,694 dated Mar. 20, 2019 (8 pages).
U.S. Notice of Allowance for U.S. Appl. No. 15/621,806 dated Jun. 4, 2019 (5 pages).
U.S. Notice of Allowance for U.S. Appl. No. 15/621,806 dated Mar. 21, 2019 (10 pages).
U.S. Notice of Allowance for U.S. Appl. No. 15/361,668 dated Feb. 9, 2018 (7 pages).
U.S. Office Action for U.S. Appl. No. 15/395,694 dated Aug. 9, 2018 (8 pages).
U.S. Office Action for U.S. Appl. No. 15/395,725 dated Jun. 28, 2019 (27 pages).
U.S. Office Action for U.S. Appl. No. 15/395,725 dated Nov. 16, 2018 (7 pages).
U.S. Office Action for U.S. Appl. No. 15/621,806 dated Sep. 25, 2018 (25 pages).
U.S. Office Action for U.S. Appl. No. 15/638,312 dated May 16, 2019 (6 pages).
Broussard, Mitchel, "Chatbot-Like Siri Patent Includes Intelligent Image, Video, and Audio Recognition Within Messages", MacRumors, May 11, 2017, 11 pages.
Chen, Yilun Lulu, "Alibaba Challenges Google, Amazon With New Echo-Like Device", Bloomberg, Jul. 5, 2017, 3 pages.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '" Cnet, May 18, 2017, 7 pages.
Google Developers Newsletter "Google Assistant SDK", developers.google.com, 2 pages.
Gurma, Mark and Webb, Alex, "Apple Is Manufacturing a Siri Speaker to Outdo Google and Amazon", Bloomberg, May 31, 2017, 3 pages.
International Patent No. PCT/US2014/057247,International Search Report and Written Opinion dated Dec. 30, 2014, 17 pages.
International Preliminary Report on Patentability on PCT/US2014/057247 dated Apr. 14, 2016, 9 pgs.
Koetsier, John, "Ads on Amazon Echo: Wendy's, ESPN, and Progressive Among Brands Testing", Forbes, May 11, 2017, 3 pages.
Lardinois, Frederic, Google Launches New Ad Unit for Responsive Sites, Google AdSense, http://techcrunch.com/2013/07/31/google-launches-new-ad-unit-for-responsive-sites/, Jul. 31, 2013, 3 pgs.
Lee, Dave, "The five big announcements from Google I/O", BBC, May 18, 2017, 11 pages.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Sablich, Justin, "Planning a Trip With the Help of Google Home", New York Times, dated May 31, 2017, 6 pages.
Smith, Dave, "The Amazon Echo got 2 incredibly useful features thanks to a new update", Business Insider, Jun. 1, 2017, 2 pages.
U.S. Notice of Allowance on U.S. Appl. No. 14/048,921 dated Mar. 13, 2017.
U.S. Office Action on U.S. Appl. No. 14/048,921 dated Jul. 20, 2016.
U.S. Office Action on U.S. Appl. No. 14/048,921 dated Nov. 25, 2015.
Willens, Max, "For publishers, Amazon Alexa holds promise but not much money (yet)", Digiday, Jul. 6, 2017, 5 pages.
"Amazon and Google Want to Turn Their Smart Home Speakers Into Telephone Replacements—Mac Rumors" MacRumors, 9 pages.
"Apple Patent Reveals a New Security Feature Coming to Siri" 6 pages.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
Close, "Amazon Echo Will Give You These Deals If You Order Through Alexa This Weekend," Web Article, Nov. 18, 2016, Time.com (2 pages).
Collins, Terry "Can Twitter Save itself? The Social Network is Slowly gaining users, but still Lags Far Behind Rivals. Is a Turnaround Possible?" 3 pages.

(56) References Cited

OTHER PUBLICATIONS

Cook, "A Siri for advertising: These mobile ads talk back to you," Web Article, Apr. 1, 2013, Geekwire.com (7 pages).
Golgowski, Nina, "This Burger King Ad Is Trying to Control Your Google Home Device", Apr. 12, 2017, 7 pages.
Larson, Selena "Google Home Now Recognizes your Individual Voice" dated Apr. 20, 2017, 3 pages.
Nieva, Richard, "Google Home and eBay can tell you how much that's worth", 3 pages.
Notice of Allowance on U.S. Appl. No. 13/222,380 dated Oct. 7, 2013.
Notice of Allowance on U.S. Appl. No. 14/176,845 dated Aug. 6, 2015.
Office Action on U.S. Appl. No. 13/222,380 dated Apr. 3, 2013.
Office Action on U.S. Appl. No. 13/222,380 dated Aug. 16, 2013.
Office Action on U.S. Appl. No. 14/176,845 dated Apr. 2, 2015.
Purcher, Jack "Today Google Home's Virtual Assistant Can Learn its Owner's Voice for Security Reason's like Apple's Patent Pending Idea" Apr. 20, 2017, 4 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Siegal, Daniel, "IP Attys Load Up Apps'Legal Challenges At' Silicon Beach" 6 pages.
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
U.S. Notice of Allowance on U.S. Appl. No. 14/870,725 dated Sep. 1, 2016.
U.S. Office Action on U.S. Appl. No. 14/870,725 dated May 12, 2016.
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion for PCT Appl. Ser. No. PCT/US2017/049780 dated Nov. 28, 2017, 11 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Office Action on U.S. Appl. No. 15/361,668 dated Jan. 4, 2018, 7 pages.
"Walmart and Google to offer voice-enabled shopping", BBC News, Aug. 23, 2017.
Crist, Ry, "Logitech Harmony's Alexa Skill just got a whole lot better", cnet, Jul. 13, 2017 (2 pages).
European Search Report on EP 14849752, dated Jun. 4, 2017, 8 pages.
Gibbs, Samuel, "Your Facebook Messenger app is about to be filled with ads", The Guardian, Jul. 12, 2017 (3 pages).
Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
U.S. Office Action on U.S. Appl. No. 15/361,668 dated Sep. 22, 2017.
U.S. Office Action on U.S. Appl. No. 15/361,668 dated Aug. 23, 2017.
U.S. Office Action on U.S. Appl. No. 15/361,668 dated Aug. 23, 2017, 6 pages.
Foreign Search Report on EP Appln. Ser. No. 19187924.6 dated Sep. 3, 2019 (6 pages).
Notice of Allowance on U.S. Appl. No. 15/621,806 dated Sep. 17, 2019 (2 pages).
Notice of Allowance on U.S. Appl. No. 15/638,312 dated Sep. 17, 2019 (8 pages).
Notice of Allowance on U.S. Appl. No. 15/395,725 dated Oct. 18, 2019.
Notice of Allowance on U.S. Appl. No. 15/621,806 dated Aug. 13, 2019 (2 pages).
Examination Report for EP Appln. Ser. No. 17771624.8 dated Jan. 21, 2020 (6 pages).
Non-Final Office Action for U.S. Appl. No. 16/544,367 dated Oct. 31, 2019 (11 pages).
Notice of Allowance for CN Appln. Ser. No. 201480054057.8 dated Aug. 30, 2019 (4 pages).
Notice of Allowance for JP Appln. Ser. No. 2017-556911 dated Jun. 10, 2019 (5 pages).
Notice of Allowance for JP Appln. Ser. No. JP 2016-545216 dated Feb. 4, 2019 (5 pages).
Notice of Allowance for KR Appl. Ser. No. 10-2017-7031385 dated Jun. 19, 2019 (3 pages).
Notice of Allowance for KR Appln. Ser. No. 10-2017-7031379 dated Jul. 31, 2019 (3 pages).
Notice of Allowance for U.S. Appl. No. 15/395,725 dated Jan. 21, 2020 (14 pages).
Notice of Allowance for U.S. Appl. No. 15/638,312 dated Jan. 2, 2020 (8 pages).
Notice of Allowance for U.S. Appl. No. 16/544,367 dated Jan. 29, 2020 (8 pages).
Office Action for KR Appln. Ser. No. 10-2019-7032040 dated Mar. 30, 2020 (9 pages).
Office Action for JP Appln. Ser. No. 2019-039721 dated Mar. 30, 2020 (4 pages).
Examination Report for AU Appln. Ser. No. 2017386098 dated Mar. 3, 2020 (3 pages).
First Office Action for CN Appln. Ser. No. 201780001636.X dated Sep. 8, 2020 (10 pages).

(56) References Cited

OTHER PUBLICATIONS

Corrected Notice of Allowance for U.S. Appl. No. 16/818,736 dated Oct. 6, 2020 (4 pages).
Examination Report for IN Appln. Ser. No. 201747039648 dated Sep. 21, 2020 (5 pages).
First Office Action for CN Appln. Ser. No. 201780001629.X dated Jul. 14, 2020 (19 pages).
Notice of Allowance for U.S. Appl. No. 16/818,736 dated Oct. 2, 2020 (20 pages).
Notice of Reasons for Rejection for JP 2019-127639 dated Sep. 7, 2020 (6 pages).
Office Action for KR Appln. Ser. No. 10-2019-7026715 dated Aug. 2, 2020 (6 pages).
Simonite, Tom, "Dinner and a Movie? Amazon Alexa Makes It Easier to Do Both", Wired, Jun. 5, 2019, retrieved Sep. 23, 2020 from URL: https://www.wired.com/story/dinner-movie-amazon-alexa-makes-easier-do-both/ (5 pages).
Examination Report for IN Appln. Ser. No. 201747040055 dated Oct. 21, 2020 (6 pages).
Notice of Allowance for U.S. Appl. No. 16/818,736 dated Nov. 6, 2020 (3 pages).
Notice of Allowance for U.S. Appl. No. 16/818,736 dated Nov. 30, 2020 (3 pages).
Non-Final Office Action for U.S. Appl. No. 16/586,271 dated Jan. 1, 2021 (14 pages).
Office Action for KR Appln. Ser. No. 10-2016-7009406 dated Dec. 15, 2020 (6 pages).

\* cited by examiner

RETARGETING IN A SEARCH ENVIRONMENT

CROSS REFERENCE TO RELATED APPLICATIONS

This application is a continuation-in-part of and claims priority under 35 U.S.C. § 120 to U.S. application Ser. No. 15/361,668, filed Nov. 28, 2016, which claims the benefit of priority under 35 U.S.C. § 120 as a continuation of U.S. application Ser. No. 14/870,725, now U.S. Pat. No. 9,530,153, filed Sep. 30, 2015, which is a continuation of and claims priority under 35 U.S.C. § 120 to U.S. application Ser. No. 14/176,845, now U.S. Pat. No. 9,177,329, filed on Feb. 10, 2014, which is a continuation of and claims priority under 35 U.S.C. § 120 to U.S. application Ser. No. 13/222,380, now U.S. Pat. No. 8,650,188, filed on Aug. 31, 2011. This application also claims the benefit of priority under 35 U.S.C. § 120 as a continuation-in-part of U.S. application Ser. No. 15/395,725, filed Dec. 30, 2016. Each of the foregoing applications are hereby incorporated herein by reference in their entirety.

BACKGROUND

The Internet provides access to a wide variety of resources. For example, video and/or audio files, as well as web pages for particular subjects or particular news articles are accessible over the Internet. Access to these resources presents opportunities for digital components to be provided with these resources and search results pages that facilitate identification of these resources. Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

According to one aspect of the disclosure, a system for selecting digital components includes a data processing system that can have one or more processors. The data processing system can receive, from a client device, interaction data including a set identifier and an indication that the client device performed a pre-specified interaction with a script associated with the set identifier. The data processing system can identify a first plurality of candidate digital components based on a first match between a query and a first keyword associated with the first plurality of digital components. The data processing system can identify a second plurality of candidate digital components based on a second match between the query, a second keyword associated with the second plurality of digital components, and the interaction data. The data processing system can select a digital component from the first plurality of candidate digital components and the second plurality of candidate digital component based on a performance metric of each of the candidate digital components in the first plurality of digital components and the second plurality of digital components. The data processing system can transmit the digital component to the client device.

According to another aspect of the disclosure, a method for selecting digital components includes receiving, by a data processing system from a client device, interaction data. The interaction data can include a set identifier and an indication that the client device performed a pre-specified interaction with a script associated with the set identifier. The method can include identifying, by the data processing system, a first plurality of candidate digital components based on a first match between a query and a first keyword associated with the first plurality of digital components. The method can include identifying, by the data processing system, a second plurality of candidate digital components based on a second match between the query, a second keyword associated with the second plurality of digital components, and the interaction data. The method can include selecting, by the data processing system, a digital component from the first plurality of candidate digital components and the second plurality of candidate digital component based on a performance metric of each of the candidate digital components in the first plurality of digital components and the second plurality of digital components. The method can include transmitting, by the data processing system, the digital component to the client device.

BRIEF DESCRIPTION OF THE DRAWINGS

Like reference numbers and designations in the various drawings indicate like elements.

DETAILED DESCRIPTION

Figure 1A:
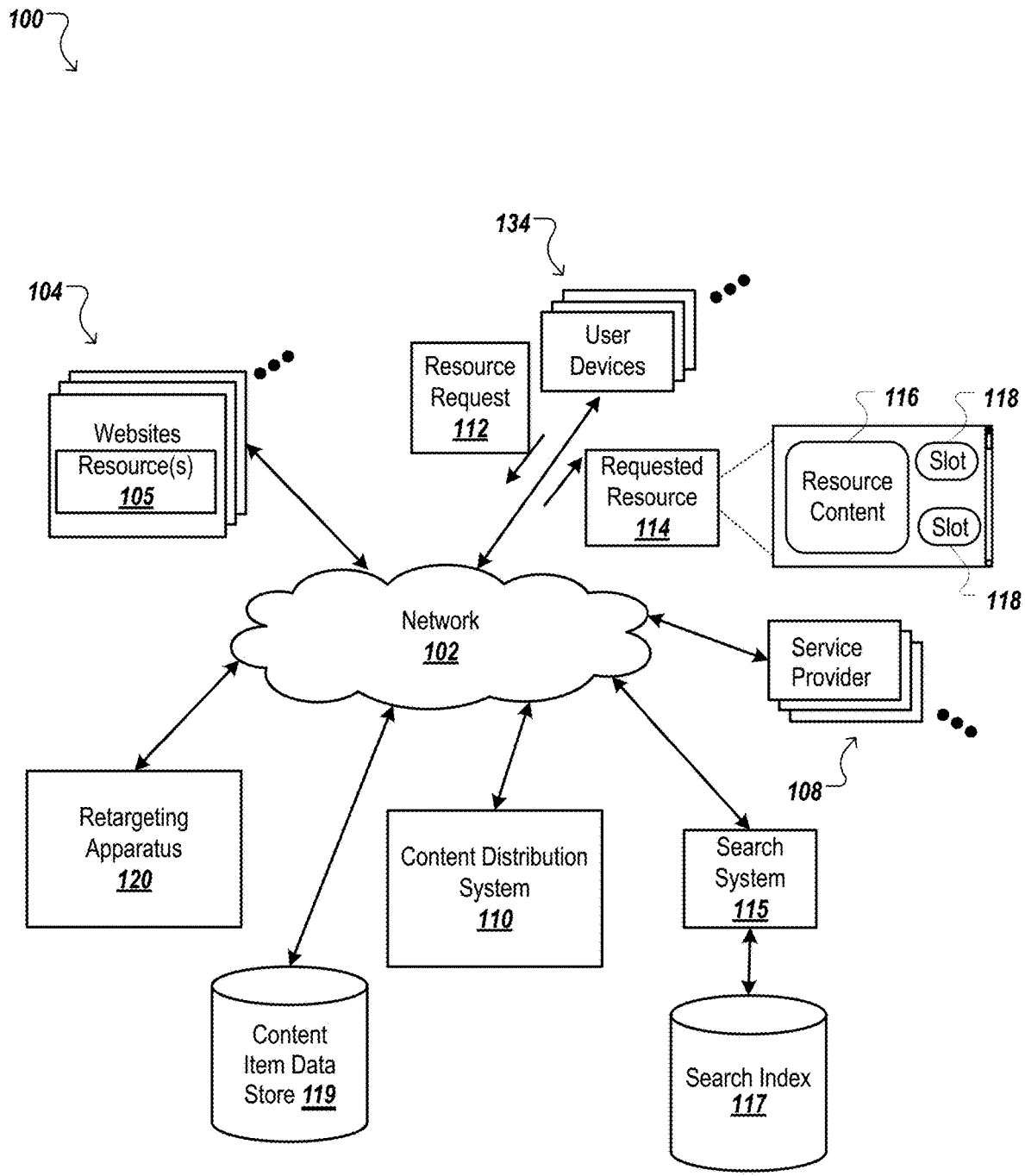
FIG. 1A is a block diagram of an example environment in which a content distribution system manages distribution of content items.

Following below are more detailed descriptions of various concepts related to, and implementations of, methods, apparatuses, and systems to optimize processing of multiple voice activated audio input data packets in a voice activated computer network environment. The various concepts introduced above and discussed in greater detail below may be implemented in any of numerous ways.

Systems and methods of the present disclosure relate generally to a data processing system that optimizes or dynamically adjusts multiple voice activated packet (or other protocol) based input audio signals via packet based transmissions in a voice activated computer network environment. The data processing system can improve the efficiency and effectiveness of data packet transmission over one or more computer networks by, for example, extracting information from input audio signals to generate multiple corresponding action data structures. The action data structures can be constructed for transmission during communication sessions between the data processing system and multiple different service provider computing devices. From, for example, the packets of different action data structures, the data processing system can determine at least one sequence dependency parameter. The sequence dependency parameters can indicate an order of operation of actions indicated by the action data structures or their corresponding data transmissions. Based on the sequence dependency parameters, the data processing system can merge or combine multiple action data transmissions into a single thread.

The single thread can include sequence dependent operations of multiple action data structures. The data processing system can provide the single thread or portions thereof (e.g., at least one packet based data structure) to multiple service provider computing devices to accomplish actions indicated by the single thread. The data processing system can also provide the single thread or portions thereof to at least one content provider computing device to obtain content items associated with the single thread. The service provider computing devices and the content provider computing devices can communicate, via or bypassing the data processing system, with at least one client computing device (e.g., a source of the audio input signals) to render audio output to accomplish the actions indicated by the thread, or to render content items at the client computing device.

By merging or otherwise consolidating multiple action data structures into a single thread, and by identifying sequence dependent operations indicated by the single thread, the processing, power, and memory utilization requirements of the data processing system are reduced, relative to individual processing of multiple action data structures without such consolidation and sequence dependency identification. For example, asynchronous or out-of-sequence processing of operations of individual action data structures can cause untimely, premature, or unnecessary data packet communications via established communication sessions between the data processing system and the service provider or content provider computing devices. This wastes bandwidth, and can cause unnecessary processing operations to occur by the data processing system as well as by the service provider or content provider computing devices, which wastes computing resources of multiple computing devices.

Based on identified sequence dependent operations in the single thread, the data processing system can temporarily or permanently skip initial operations of a set of sequence dependent operations and can instead proceed to an operation that corresponds to a later-in-time or final operation. By bypassing packet or other protocol based data transmissions that correspond to an early operation of a plurality of sequence dependent operations, and instead proceeding directly to packet based data transmissions for later stage operations in a sequence of operations the data processing system can reduce, delay, or eliminate data processing associated with the early stage operations. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives a first input audio signal. From the first input audio signal, the data processing system can identify a first request and a first trigger keyword corresponding to the request. Based on the first trigger keyword or the first request, the data processing system can generate a first action data structure, and can construct or prepare a first data transmission including the first action data structure. The first data transmission can be routed as a data packet or other protocol based transmission from the client computing device to at least one first service provider computing device as part of a first communication session.

The data processing system can receive a second input audio signal. From the second input audio signal, the data processing system can identify a second request and a second trigger keyword corresponding to the request. Based on the second trigger keyword or the second request, the data processing system can generate a second action data structure, and can construct or prepare a second data transmission including the second action data structure. The second data transmission can be routed as a data packet or other protocol based transmission from the client computing device to at least one second service provider computing device as part of a second communication session. The first and second service provider computing devices can correspond to different entities that do not communicate with each other via the data processing system.

The data processing system can obtain data packets of the first and second transmissions (e.g., from the first and second data structures) and can extract information from the data packets to determine at least one sequence dependency parameter. The sequence dependency parameter can indicate a sequence of operations for actions of the first and second data structures. The data processing system can compare the sequence dependency parameter to a threshold (e.g., a rule, policy, or value) and based on the comparison the data processing system can merge the first and second data transmissions (or associated action data structures) into a single thread. The single thread can indicate actions of the first and second (or more) action data structures, and can indicate a sequence or order of these actions, as well as sequence dependencies where for example a second action cannot (or is not scheduled to) begin until after a first action is complete.

The data processing system can reorder, skip, or at least temporarily bypass operations related to some actions of the single thread, based for example on sequence dependencies or based on input received from the client computing device. This can be done before or without performing at least some of the data processing operations based on the bypassed action. Bypassing the processing operations for a first action can cause data related to a second action to identified, transmitted and rendered with less data processing and less electrical power usage than would be the case without the bypass.

FIG. 1A is a block diagram of an example environment 100 in which a content distribution system 110 manages distribution of content items or digital components. Digital components can be a component of content items. Content items can be component of digital components. The example environment 100 includes a network 102, such as a local area network (LAN), a wide area network (WAN), the Internet, or a combination thereof. The network 102 connects websites 104, user devices 134 (also referred to as client computing devices), service provider devices 108, and the content distribution system 110. The example environment 100 may include many thousands of websites 104, user devices 134, and service provider devices 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items. An example of a content item is a digital component that is presented on a search results page.

A user device 134 is an electronic device that is under control of a user and is capable of requesting and receiving resources over the network 102. Example user devices 134 include personal computers, mobile communication devices, and other devices that can send and receive data over the network 102. A user device 134 typically includes a user application, such as a web browser, to facilitate the sending and receiving of data over the network 102.

A user device 134 can submit a resource request 112 that requests a resource 105 from a website 104. In turn, data representing the requested resource 114 can be provided to the user device 134 for presentation by the user device 134. The requested resource 114 can be, for example, a home page of a website 104, a search results page in which search results are presented, or another resource 105. The data representing the requested resource 114 can include data that cause presentation of resource content 116 (e.g., search results) at the user device 134. The data representing the requested resource 114 can also include data specifying a portion of the resource (e.g., a portion of a web page) in which digital components (or other content items) can be presented. Throughout this document, these specified portions of the resource or user display are referred to as digital component slots 118.

User devices 134 can submit search queries to the search system 115 over the network 102. In response, the search system 115 accesses a search index 117 to identify resources 105 that are relevant to the search query. The search system 115 identifies the resources 105 in the form of search results and returns the search results to the user devices 134 in search results pages. A search result is data generated by the search system 115 that identifies resources 105 that are responsive to a particular search query, and includes a link to the resources 105. An example search result can include a web page title, a snippet of text or a portion of an image extracted from the web page, and the URL of the web page. Search results pages can also include one or more digital component slots 118 in which digital components can be presented.

For example, users that are interested in a particular product may research the particular product by submitting one or more search queries to the search system 115 in an effort to identify information that will assist the user in determining whether to purchase the product. For example, a user that is interested in purchasing a DVD player may submit search queries such as "portable DVD player," "cheap DVD player," "Brand X DVD player." In response to each of these search queries, the user may be provided search results that have been identified as responsive to the search query (e.g., have at least a minimum threshold relevance to the search query, for example, based on cosine similarity measures or clustering techniques). The user can then select one or more of the search results to request presentation of a web page or another resource 105 that is referenced by a URL associated with the search result.

When search results are requested by a user device 134, the content distribution system 110 receives a request for digital components (or another content item) to be provided with the search results. In response to the request, the content distribution system 110 selects digital components that are determined to be relevant to the search query. In turn, the selected digital components are provided to the user device 134 for presentation with the search results.

Based on data included in the request for digital components, the content distribution system 110 selects digital components that are eligible to be provided in response to the request ("eligible digital components"). For example, eligible digital components can include digital components having characteristics matching the characteristics of the digital component slots 118 and that are identified as relevant to a search query that has been submitted by a user. Digital components having targeting keywords that are matched by the search query can be selected as eligible digital components by content distribution system 110.

For example, a digital component for "Service provider A" that sells portable DVD players may be targeted using the targeting keyword "portable DVD player." This targeting keyword would be matched by the search query "portable DVD player" (and possibly other search queries), and may be presented with the search results page that is provided to the user. If the user selects (e.g., clicks) the digital component for Service Provider A, the user's device can be redirected, for example, to a web page provided for Service provider A. This web page can include, for example, information about a portable DVD player that Service Provider A sells, a price at which Service Provider A will sell the portable DVD player, and user interface elements that enable the user to specify a number of the DVD players that the user will buy, as well as payment information and shipping information required to complete the transaction.

A targeting keyword can match a search query by having the same textual content ("text") as the resource keyword or search query. For example, a digital component associated with the targeting keyword "DVD" can be an eligible digital component for a digital component request including the search query "DVD."

A targeting keyword can also match a search query by having text that is identified as being relevant to (e.g., having at least a minimum relevance score relative to) a targeting keyword despite having different text than the targeting keyword. For example, a digital component having the targeting keyword "DVD" may also be selected as an eligible digital component for a digital component request including a search query for "Movie Disk" because a DVD is a type of movie disk, and therefore, is likely to be relevant to the term "Movie Disk."

Targeting keywords and other data associated with the distribution of digital components can be stored in a content item data store 119. The content item data store 119 is a data store that stores references to digital components, digital component campaign parameters that are used to control distribution of the digital components, data representing conditions under which the digital component was selected for presentation to a user, and data representing actions taken by users in response to presentation of the digital component. For example, the content item data store can store targeting keywords, bids, and other criteria with which eligible digital components are selected for presentation.

Targeting digital components using keywords enables a service provider to target users that, based at least in part on the search queries that the users submit, are considered interested in particular types of products. However, service providers may want to more specifically target particular digital components to users that have previously visited one or more of the service provider's web pages and/or performed other specified actions, referred to as target interactions.

For example, if a user that submits the search query "DVD player" has previously requested, from the service provider's site, presentation of a web page on which information about available DVD players is presented, the service provider may consider this user more likely to buy a DVD player. Therefore, the amount the service provider may be willing to pay to present a digital component for DVD players to this user may be greater than the amount that the service provider is willing to pay to present the DVD player digital component to another user (i.e., that did not previously visit the DVD page on the service provider's site). Alternatively (or additionally), the service provider in this example may want to present a special incentive (e.g., offer 10% off of a DVD player) to this user to purchase a DVD player, while not providing the special incentive to other users that did not view the DVD page at the service provider's site.

In a search environment, the fact that a user submits a particular search query does not provide information about the user's prior online activity. For example, while a user that submits the search query "DVD player" can be considered to be interested in information about DVD players, this search query alone does not indicate whether the user previously viewed the DVD page on a particular service provider's site. Thus, using keyword targeting alone, it can be difficult for a service provider target digital components to users who, prior to submitting a particular search query, have previously performed pre-specified actions (e.g., requested particular pages from the service provider's site).

The environment 100 includes a retargeting apparatus 120 that facilitates targeting digital components (or other content items) to a set of users based, at least in part, on the users having previously performed a pre-specified action (i.e., a target interaction). The retargeting apparatus 120 can be a component of the content distribution system 110. In some implementations, the retargeting apparatus 120 enables a service provider to create, or request creation of, a retargeting set with which one or more retargeted digital components (or other content item) can be targeted. A retargeting set is a set of user identifiers for users that have been determined (e.g., based on interaction data) to have performed a target interaction. As described in more detail below, the service provider can specify the target interaction.

As described in more detail with reference to FIG. 2, a service provider can request from the retargeting apparatus 120 (e.g., through a digital component management user interface) a retargeting script that can facilitate population of the retargeting set in response to performance of the target interaction. The retargeting script is a portion of code that can be embedded in one or more of the service provider's web pages. When the user performs an action that causes execution of the retargeting script (e.g., the user requests the web page or interacts with a specified portion of the web page), the retargeting script provides interaction data to the retargeting apparatus 120.

The interaction data includes data indicating that a user identifier (e.g., a cookie or another user identifier, such as an account identifier) is to be added to a retargeting set. In response to receiving the interaction data, the retargeting apparatus 120 adds the user identifier to a retargeting set that is stored, for example, in the content item data store 119. When a user identifier is added to a retargeting set, the user identifier is considered to be a retargeted identifier. As used throughout this document the term retargeted identifier refers to a user identifier that has been added to a retargeting set.

Each retargeting script can include, for example, information specifying a set identifier. The set identifier is a unique character string that is indicative of the retargeting set with which the retargeting script is associated. The retargeting script can include the set identifier in the interaction data such that, upon receipt of interaction data, the retargeting apparatus 120 can add user identifiers to the correct retargeting set. For example, if a service provider created a retargeting set for users that requested presentation of one of the service provider's web pages, the set identifier for this retargeting set could be included in the retargeting script, and added to interaction data such that the user identifiers for users that requested presentation of the service provider's web page would be added to this retargeting set.

In some implementations, each retargeting set that is stored in the content item data store 119 are anonymized to protect the identity of the user with which the user interaction data is associated. For example, each user identifier can be a pseudo-random string that uniquely identifies a user device (or user), but does not indicate the identity of a user. Alternatively (or additionally), the user interaction data can include a hash value of the user identifier rather than the user identifier, thereby further protecting user privacy. In some implementations, user interaction data are only stored for users that opt-in to having user interaction data stored. For example, a user can be provided an opt-in/opt-out user interface that allows the user to specify whether they approve storage of data representing their interactions with content.

In some implementations, the availability (or eligibility) of a retargeting set for targeting purposes can be conditioned on the number of retargeted identifiers in the retargeting set exceeding a pre-specified threshold value. For example, a retargeting set may be considered ineligible to be used to target digital components until there are at least 500 retargeted identifiers in the retargeting set. Conditioning the availability of a retargeting set based on the number of retargeted identifiers in the retargeting set further protects the identity of the users with which the retargeted identifiers are associated by ensuring that at least a minimum number of different users have performed the target interaction.

The retargeting apparatus 120 can enable a service provider to target digital components using one or more retargeting sets. In some implementations, the retargeting apparatus 120 enables a service provider to specify a set of digital components (or other content items) that are only eligible for presentation with a search results page when the user identifier that is associated with the content item request (e.g., the user identifier for the user device from which the search query was submitted) matches one of the retargeted identifiers that are included in a specified retargeting set.

For example, a service provider may select a particular digital component and specify that the digital component is to be targeted using the retargeting set. The service provider can also specify that all digital components that are included in a particular digital component group (e.g., a set of one or more digital components that that have been grouped together) or digital component campaign (e.g., a set of one or more digital component groups that have been grouped together) are to be targeted using the retargeting set. In this example, the digital components that are targeted using the retargeting set will only be eligible for presentation when the content item request (e.g., a digital component request) includes (or references) a user identifier that matches one of the retargeted identifiers in the specified retargeting set.

The retargeting apparatus 120 can enable a service provider to target digital components using the retargeting set independent of, or in addition to, other targeting criteria that are used to target the digital components. For example, a service provider may copy an existing digital component group (e.g., using a "copy ad group" function) to create a new instance of the digital component group. In this example, the service provider may edit the targeting criteria of the new instance of the digital component group to specify that digital components in the digital component group are only eligible for presentation when one of the retargeted identifiers in a particular retargeting set is matched by the user identifier that is included in the request for digital components. The eligibility of the digital components in this example is further conditioned on the other targeting criteria that were previously specified for the digital component group also being met. For example, assume that the digital component group that was copied was already targeted using only the targeting keyword "DVD player," and that the service provider only modified the targeting criteria of the new instance of the digital component group to also target the digital component group using the retargeting set. In this example, the digital components in the new instance of the digital component group will not be eligible for presentation unless the search query matches the targeting keyword "DVD player" and the user identifier specified by the request matched one of the retargeted identifiers in the retargeting set.

Throughout this document content items that are targeted using a retargeting set are referred to as retargeted content items, while content items that are targeted using targeting keywords and are not targeted using a retargeting set are referred to as keyword targeted content items. Note that both retargeted content items and keyword targeted content items can be targeted using targeting criteria other than that discussed below. For example, any of the content items can also be targeted using geographic information and/or demographic information.

Figure 1B:
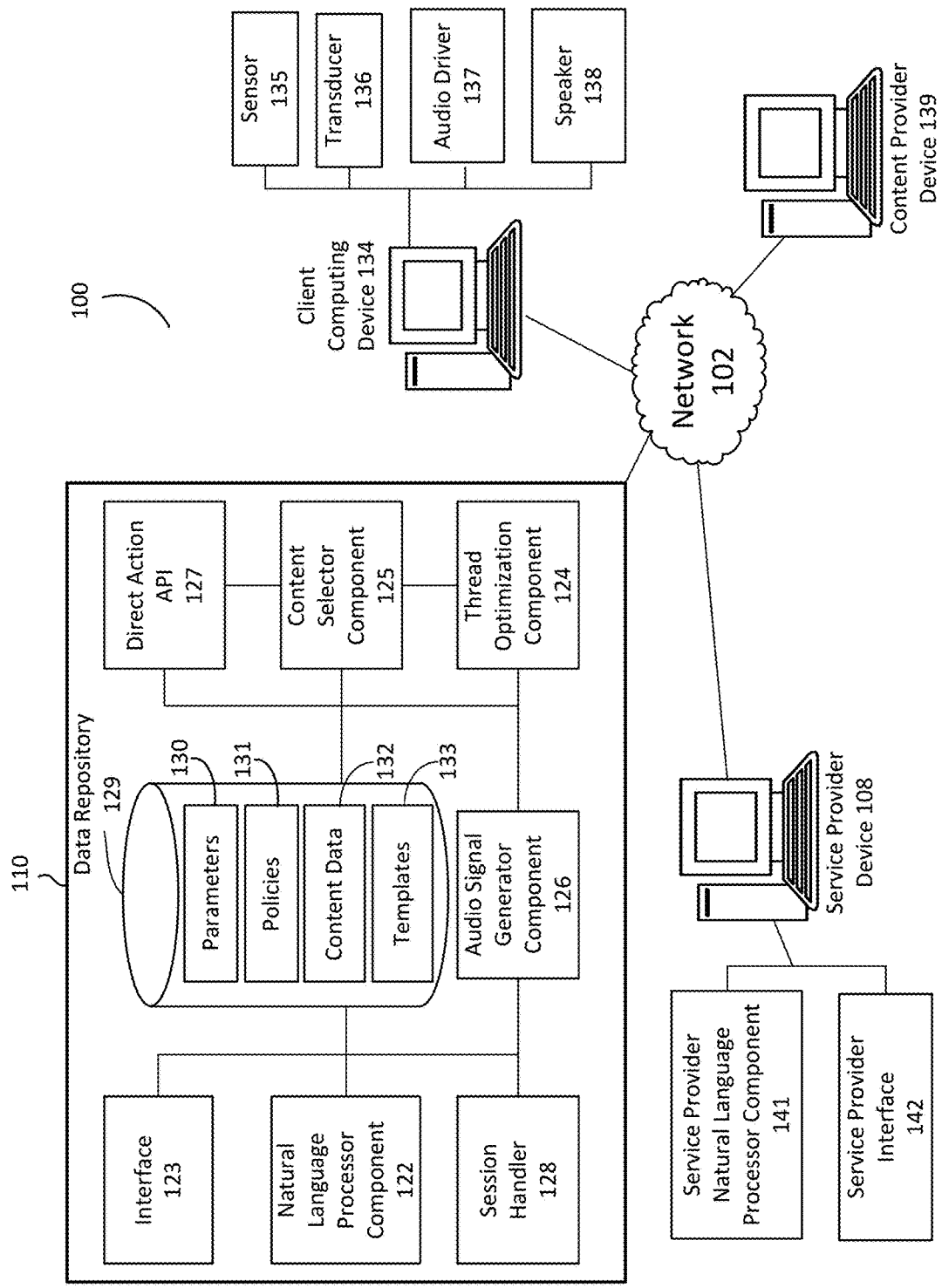
FIG. 1B depicts a system to combine multiple voice activated audio input data packets that indicated sequence dependent operations in a voice activated computer network environment.

FIG. 1B depicts an example system 100 to optimize processing of multiple action data structures having sequence dependent operations in a voice activated data packet (or other protocol) based computer network environment. The system 100 can include content distribution system 110, for example as part of a voice activated communication or planning system. The content distribution system 110 can include at least one server having at least one processor. For example, the content distribution system 110 can include a plurality of servers located in at least one data center or server farm. The content distribution system 110 can determine, from an audio input signal a request and a trigger keyword associated with the request. Based on the request and trigger keyword the content distribution system 110 can generate an action data structure. The action data structure can indicate at least one action that corresponds to the input audio signal. The content distribution system 110 can receive multiple separate input audio signals, and for each input audio signal can create a respective data structure. The content distribution system 110 can construct or otherwise prepare data transmissions for each data structure to transmit the data structures during respective communication sessions with respective other computing devices (e.g., servicer provider computing devices or content provider computing devices). The content distribution system 110 can determine, from the action data structures or corresponding data transmissions, one or more sequence dependency parameter. Based on the sequence dependency parameter, the content distribution system 110 can merge multiple data transmissions (or corresponding action data structures) into a single thread. The single thread can indicate actions from at least two action data structures, as well as orders of operations or sequence dependencies of the actions.

The content distribution system 110 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The content distribution system 110 can include servers in a data center that are stored in one or more high-density rack systems, along with associated storage systems, located for example in an enterprise data center. The content distribution system 110 with consolidated servers in this way can improve system manageability, data security, the physical security of the system, and system performance by locating servers and high performance storage systems on localized high performance networks. Centralization of all or some of the content distribution system 110 components, including servers and storage systems, and coupling them with advanced system management tools allows more efficient use of server resources, which saves power and processing requirements and reduces bandwidth usage.

The content distribution system 110 can include at least one natural language processor (NLP) component 122, at least one interface 123, at least one thread optimization component 124, at least one content selector component 125, at least one audio signal generator component 126, at least one direct action application programming interface (API) 135, at least one session handler component 128, and at least one data repository 129. The NLP component 122, interface 123, thread optimization component 124, content selector component 125, audio signal generator component 126, direct action API 127, and session handler component 128 can each include at least one processing unit, server, virtual server, circuit, engine, agent, appliance, or other logic device such as programmable logic arrays configured to communicate with the data repository 129 and with other computing devices (e.g., the client computing device 134, the content provider computing device 139, or the service provider computing device 108) via the at least one computer network 102. The network 102 can include computer networks such as the internet, local, wide, metro or other area networks, intranets, satellite networks, other computer networks such as voice or data mobile phone communication networks, and combinations thereof.

The network 102 can include or constitute a display network, e.g., a subset of information resources available on the internet that are associated with a content placement or search engine results system, or that are eligible to include third party content items as part of a content item placement campaign. The network 102 can be used by the content distribution system 110 to access information resources such as web pages, web sites, domain names, or uniform resource locators that can be presented, output, rendered, or displayed by the client computing device 134. For example, via the network 102 a user of the client computing device 134 can access information or data provided by the content provider computing device 139 or the service provider computing device 108.

The network 102 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof The network 102 can include a wireless link, such as an infrared channel or satellite band. The topology of the network 102 may include a bus, star, or ring network topology. The network 102 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 134, the content provider computing device 139, and the service provider computing device 108 can each include at least one logic device such as a computing device having a processor to communicate with each other or with the content distribution system 110 via the network 102. The client computing device 134, the content provider computing device 139, and the service provider computing device 108 can each include at least one server, processor or memory, or a plurality of computation resources or servers located in at least one data center. The client computing device 134, the content provider computing device 139, and the service provider computing device 108 can each include at least one computing device such as a desktop computer, laptop, tablet, personal digital assistant, smartphone, portable computer, server, thin client computer, virtual server, or other computing device.

The client computing device 134 can include at least one sensor 135, at least one transducer 136, at least one audio driver 137, and at least one speaker 138. The sensor 135 can include a microphone or audio input sensor. The transducer 136 can convert the audio input into an electronic signal. The audio driver 137 can include a script or program executed by one or more processors of the client computing device 134 to control the sensor 135, the transducer 136 or the audio driver 137, among other components of the client computing device 134 to process audio input or provide audio output. The speaker 138 can transmit the audio output signal.

The client computing device 134 can be associated with an end user that enters voice queries as audio input into the client computing device 134 (via the sensor 135) and receives audio output in the form of a computer generated voice that can be provided from the content distribution system 110 (or the content provider computing device 139 or the service provider computing device 108) to the client computing device 134, output from the speaker 138. The computer generated voice can include recordings from a real person or computer generated language.

The content provider computing device 139 can provide audio based content items for display by the client computing device 134 as an audio output content item. The content item can include an offer for a good or service, such as a voice based message that states: "Would you like me to order you a taxi?" For example, the content provider computing device 139 can include memory to store a series of audio content items that can be provided in response to a voice based query. The content provider computing device 139 can also provide audio based content items (or other content items) to the content distribution system 110 where they can be stored in the data repository 129. The content distribution system 110 can select the content items that include an audio component and provide (or instruct the content provider computing device 139 to provide) the content items to the client computing device 134. The audio based content items can be exclusively audio or can be combined with text, image, or video data. The content items can include one or more audio files that when rendered provide an audio output or acoustic wave. The content items can include other content (e.g., text, video, or image content) in addition to or instead of audio content. For example, the content items can include text or image files, or combinations thereof, that do not include audio files and that do not render audio output.

The service provider computing device 108 can include at least one service provider natural language processor (NLP) component 141 and at least one service provider interface 142. The service provider NLP component 141 (or other components such as a direct action API of the service provider computing device 108) can engage with the client computing device 134 (via the content distribution system 110 or bypassing the content distribution system 110) to create a back-and-forth real-time voice or audio based conversation (e.g., a session) between the client computing device 134 and the service provider computing device 108. For example, the service provider interface 142 can receive or provide data messages to the direct action API 127 of the content distribution system 110. The service provider computing device 108 and the content provider computing device 139 can be associated with the same entity. For example, the content provider computing device 139 can create, store, or make available content items for a car sharing service, and the service provider computing device 108 can establish a session with the client computing device 134 to arrange for a delivery of a taxi or car of the car share service to pick up the end user of the client computing device 134. The content distribution system 110, via the direct action API 127, the NLP component 122 or other components can also establish the session with the client computing device 134, including or bypassing the service provider computing device 108, to arrange for example for a delivery of a taxi or car of the car share service.

The data repository 129 can include one or more local or distributed databases, and can include a database management system. The data repository 129 can include computer data storage or memory and can store one or more parameters 130, one or more policies 131, content data 132, or templates 133 among other data. The parameters 130, policies 131, and templates 133 can include information such as rules about a voice based session between the client computing device 134 (or the service provider computing device 108) and the content distribution system 110. The content data 132 can include content items for audio output or associated metadata, as well as input audio messages that can be part of one or more communication sessions with the client computing device 134.

The content distribution system 110 can include an application, script or program installed at the client computing device 134, such as an app to communicate input audio signals to the interface 123 of the content distribution system 110 and to drive components of the client computing device to render output audio signals. The content distribution system 110 can receive data packets or another signal that includes or identifies an audio input signal. For example, the content distribution system 110 can execute or run at least part of the NLP component 122 to receive the audio input signal.

The NLP component 122 can convert the audio input signal into recognized text by comparing the input signal against a stored, representative set of audio waveforms (e.g., in the data repository 129) and choosing the closest matches. The representative waveforms are generated across a large set of users, and can be augmented with speech samples. After the audio signal is converted into recognized text, the NLP component 122 can match the text to words that are associated, for example via training across users or through manual specification, with actions that the content distribution system 110 can serve.

The audio input signal can be detected by the sensor 135 (e.g., a microphone) of the client computing device. Via the transducer 136, the audio driver 137, or other components the client computing device 134 can provide the audio input signal to the content distribution system 110 (e.g., via the network 102) where it can be received (e.g., by the interface 123) and provided to the NLP component 122 or stored in the data repository 129 as content data 132.

The system 100 can optimize processing of action data structures that include sequence dependent operations in a voice activated data packet (or other protocol) environment. For example, the content distribution system 110 can include or be part of a voice activated assistant service, voice command device, intelligent personal assistant, knowledge navigator, event planning, or another assistant program. The content distribution system 110 can provide one or more instances of audio output for display from the client computing device 134 to accomplish tasks related to this input audio signal. The tasks can include, for example, communicating with the service provider computing device 108 or other third party computing devices to make dinner reservations or purchase movie tickets. For example, an end user can enter an input audio signal into the client computing device 134 of: "OK, I would like to go to go dinner tonight." This input audio signal can be detected by the sensor 135 (e.g., a microphone) of the client computing device 134 and transformed (e.g., by the transducer 136) into a data packet or other protocol based structure for transmission to the content distribution system 110.

The NLP component 122 can receive or otherwise obtain at least one first input audio signal. For example, via the interface 123 and the computer network 102 the NLP component 122 can obtain the first input audio signal from the client computing device 134. The NLP component 122 can extract data from or otherwise parse the first input audio signal to identify at least one first request or at least one first trigger keyword corresponding to the first request. The first request can indicate intent or subject matter of the first input audio signal, e.g., an intent to eat dinner. The first trigger keyword can indicate a type of action likely to be taken. For example, the NLP component 122 can parse the first input audio signal to identify at least one request to leave home for the evening for dinner. The first trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary or sub-action to at least one other action that is indicated by the request.

The NLP component 122 can receive a second input audio signal. For example, the first audio input signal can be "OK, I would like to go to go dinner tonight" and the second audio input signal can be "OK, I would like to catch a movie later". The NLP component 122 can receive or otherwise obtain the second input audio signal from any client computing device 134, in an analogous manner to which the first input audio signal was obtained, e.g., via the network 102. The NLP component 122 can extract data from or otherwise parse the second input audio signal to identify at least one second request or at least one second trigger keyword corresponding to the second request. The second request can indicate intent or subject matter of the second input audio signal, e.g., an intent to watch a movie in a theater. The second trigger keyword can indicate a type of action likely to be taken. For example, the NLP component 122 can parse the second input audio signal to identify at least one request to leave home for the evening to watch a movie. The second trigger keyword can include at least one word, phrase, root or partial word, or derivative indicating an action to be taken. For example, the trigger keyword "to catch" from the second input audio signal can indicate a need for transport, e.g., as an ancillary or sub-action to at least one other action that is indicated by the request.

The direct action API 127 can execute programs or scripts, for example from the NLP component 122, the thread optimization component 124, or the content selector component 125 to perform tasks or actions, or to identify content items responsive to input audio signals. The direct action API 127 can execute a specified action to satisfy the end user's intention, as determined by the content distribution system 110. Depending on the action specified in its inputs, the direct action API 127 can execute code or a dialog script that identifies the parameters required to fulfill a user request. Such code can look up additional information, e.g., in the data repository 129, such as the name of a home automation service, or it can provide audio output for rendering at the client computing device 134 to ask the end user questions such as the intended destination of a requested taxi, genre of a movie to watch, or type of restaurant to go to for dinner. The direct action API 127 can determine necessary parameters and can package the information into an action data structure, which can then be sent to another component such as the content selector component 125 or to the service provider computing device 108 (or content provider computing device 139) to be fulfilled.

The direct action API 127 of the content distribution system 110 can generate, based on the request or the trigger keyword, data structures for the actions of the thread. The action data structures can be generated responsive to the request. The action data structure can be included in the messages that are transmitted to or received by the service provider computing device 108. Based on the request parsed by the NLP component 122, the direct action API 127 can determine to which of a plurality of service provider computing devices 108 the message should be sent.

The direct action API 127 can generate a first action data structure based on the first trigger keyword and in response to the first request, and can generate a second action data structure based on the second trigger keyword and in response to the second request. For example, if the first input audio signal includes "go to dinner tonight" the NLP component 122 can identify the trigger word "tonight" and the request for a dinner suggestion or reservation. The direct action API 127 can package the request into a first action data structure for transmission as a message to a service provider computing device 108 (or content provider computing device 139) of a restaurant. The first input audio signal can include other requests or trigger keywords that indicate other actions, ancillary to the dinner action. These actions can be included in the first action data structure. For example, the NLP component 122 can identify first requests or first trigger keywords for transportation to or from dinner (additional actions) from the first input audio signal of "OK, I would like to go to go dinner tonight".

If, for example the second input audio signal includes "catch a movie later" the NLP component 122 can identify the request to see a movie with the trigger keywords "catch" or "later". The direct action API 127 can package the request into a second action data structure for transmission as a message to a service provider computing device 108 (or content provider computing device 139) of a movie company or movie theater. The second input audio signal can include other second requests or second trigger keywords that indicate other actions, ancillary to the movie action. These actions can be included in the second action data structure. For example, the NLP component 122 can identify first requests or first trigger keywords for transportation to or from a movie theater (additional actions) from the second input audio signal of "OK, I would like to catch a movie later".

The first and second, or any other action data structures can also be passed to the content selector component 125. The action data structures can include information for completing one or more actions associated with the request. In this example, the information can include restaurant or movie interest indicators, location information, an identification or location of a restaurant or type of restaurant, restaurant reservation information, movie show times at a theater, theater location information, or a pick up location and a destination location. The direct action API 127 can retrieve a template 133 from the repository 129 to determine which fields to include in the action data structure. The direct action API 127 can retrieve content from the repository 129 to obtain information for the fields of the data structure. The direct action API 127 can populate the fields from the template with that information to generate the data structure. The direct action API 127 can also populate the fields with data from the input audio signal or third party sources. The templates 133 can be standardized for categories of service providers or can be standardized for specific service providers. For example, ride sharing service providers can use the following standardized template 133 to create the data structure: {client_device_identifier; authentication_credentials; pick_up_location; destination_location; no_passengers; service_level}. The data structure can include variable fields. The variable fields can indicate, for example, a sequence or order of operation of multiple actions identified indicated by or related to at least one action of a data structure. The direct action API 127 can populate fields of the data structure, including variable fields. The direct action API 127 can populate or enter data into one or more variable fields of a data structure based on a sequence dependency between actions, such as a second action that begins after a first action ends.

The direct action API 127 can construct data transmissions that include data packets corresponding to action data structures. For example, the data transmissions can include packetized versions of the action data structures, e.g., data packets with header and payload regions that indicate information represented by the data structures. The data transmissions can be used to establish (e.g., take part in) at least one communication session between the service provider computing device 108 and the client computing device 134 via the content distribution system 110. The session handler component 128 can establish or identify the communication sessions via the interface 123. For example, subsequent to merging or associating action first and second data structures (or their corresponding packetized data transmissions) into a single thread, the content distribution system 110 can provide the data transmissions to the service provider computing device 108. As part of the communications of the communication session, the service provider computing device 108 can also receive, via the content distribution system 110, data packets (or other data messages) from the client computing device 106. For example, the content distribution system 110 can receive and can route inbound data messages from the client computing device 134 to the service provider computing device 108 as part of the communication session.

The thread optimization component 124 can obtain or access data packets of the first and second (and any other) data transmissions. For example, the direct action API 127 can provide the transmissions (e.g., the corresponding data packets) to the data repository 129 for storage, where they can be retrieved by the thread optimization component 124. The thread optimization component 124 can also receive the data packets (or other protocol based structure) of the data transmissions from the direct action API 127 (or other content distribution system 110 component) bypassing the data repository 129.

The thread optimization component 124 can parse or otherwise extract information from data packets of multiple data transmissions that correspond respectively to multiple action data structures. For example, the thread optimization component 124 can apply a heuristic technique to data packets of a first data transmission (or to the corresponding first data structure) and to data packets of a second data transmission (or to the corresponding second data structure) to determine at least one sequence dependency parameter. The heuristic or other statistical technique can determine or identify with a threshold degree of certainty patterns among the first and second data transmissions (or corresponding data structures) that indicate a sequence dependency of actions indicated by the data transmissions.

The sequence dependency parameter can indicate the existence or likelihood (e.g., relative to a threshold level or other benchmark) of actions represented by the data transmissions (or corresponding action data structures) having an order of operations, time, or sequence dependency on each other. The sequence dependent operations or actions, indicated by the sequence dependency parameters, can include a number of actions that occur in a known, suggested, required, or particular order. For example, going from home to a movie theater, then back home can include three sequence dependent operations or actions. The first action in this example includes travelling from home to the movie theater. The second action includes watching the movie in the theater. The third action includes returning home from the theater.

These three (and perhaps other) actions can be determined by the direct action API 127 from requests or trigger keywords corresponding to the input audio signal "OK, I would like to catch a movie later". In this example, the second action in the sequence (watching the movie) is subsequent to and dependent on the first action (going out from home to the movie theater), and the third action (returning home) is subsequent to and dependent on the first action and the second action. The third action can be considered subsequent to and dependent on the second action, as having expressed an intent to do so, the content distribution system 110 determines or predicts that the end user would watch the movie in the theater before returning home as well.

Based on the sequence dependency parameter, the thread optimization component 124 can merge two or more packetized data transmissions (or their corresponding action data structures) into a single thread. The single thread can include data identifying actions as well as other data (e.g., metadata or third party data) from multiple data action structures. The single thread can be in packetized (or other protocol based) form, e.g., in the same format as the first and second data transmissions. The single thread can also be in a data structure format, e.g., generated by the direct action API 127, or following a format of at least one template 133, policy 131, or parameter 130. The single thread can include or indicate an association or linking of actions from one or more data transmissions, or from one or more action data structures.

The data transmissions or action data structures can be merged or otherwise associated with one another by the thread optimization component 124 to generate the single thread prior to transmission of the data indicated by the action data structures via the communication session to the service provider computing device 108. In this example, the direct action API 127 or other content distribution system 110 component (e.g., the interface 123) can transmit at least part of the data indicated by the single thread, subsequent to the merger or creation of the single thread, to the service provider computing device 108 for the first time. For example, prior to creation of the single thread, the content distribution system 110 may have delayed, prevented withheld, or not transmitted data associated with the first or second (or any other) data structure. In some examples, at least some of the data indicated by individual data structures can be provided by and from the content distribution system 110 to the service provider computing device 108 prior to creation of the single thread.

The thread optimization component 124 can merge or otherwise consolidate or associate the data transmissions (or corresponding action data structures) into the single thread based on the sequence dependency parameter. For example, the first data transmission (and first data structure) can represent actions associated with the first input audio signal "OK, I would like to go to go dinner tonight" the second data transmission (and second data structure) can represent actions associated with the second input audio signal "OK, I would like to catch a movie later". The first and second (or any other) input audio signals can be sequential (following on another by less than one minute), separated from one another by time (e.g., greater than one minute), and can originate from the same or different client computing devices 134. The thread optimization component 124 can obtain data packets (or other data) representing this information, and can determine at least one sequence dependency parameter. For example, the sequence dependency parameter can indicate that the action of returning home from the movie theater occurs after the action of watching the movie, or that the action of watching the movie occurs or is predicted to occur after the action of eating dinner.

The single thread (in any data structure or format) can indicate a set of sequence dependent operations that correspond to one or more input audio signals (or corresponding data structures or data transmissions), such as a series of actions. The thread can include any two or more actions, such as a first action, a second action, and a third action. For example, a merger of the first input audio signal "OK, I would like to go to go dinner tonight," and the second input audio signal "OK, I would like to catch a movie later" can include at least one request indicating an interest to attend dinner and a movie, and at least one trigger keyword, e.g., "go" indicating a need for transportation. The thread optimization component 124 can identify at least one sequence dependency parameter indicating at least one sequence, temporal, or order of operations dependency between the actions and can generate the single thread to combine the multiple input audio signals (or corresponding template based data structures or packet/protocol based data transmissions). The thread optimization component 124 can create the single thread that indicates at least three actions, such as a dinner action (first action), a movie action (second action), and a transportation home action (third action). In this example, from the requests or the trigger keywords the thread optimization component 124 generates a single thread from multiple separate inputs that indicates the three actions. The single thread can include other actions, such as an initial transport to dinner action.

The content distribution system 110 or component thereof such as the thread optimization component 124 can determine that the actions of the thread are sequence dependent operations. For example, the thread optimization component can determine that the second action of watching the movie is subsequent to the first action of eating dinner, and that the third action of travelling home from the movie theater is after the second action of watching the movie. The thread optimization component 124 can access the parameters 130 or policies 131 in the data repository 129 to determine or otherwise estimate the order of the sequence dependent actions. For example, the parameters 130 or policies 131 could indicate that a transport action (e.g., a taxi home) can occur after an event action (e.g., watching a movie).

The content selector component 125 can obtain indications of any of the actions of the single thread. For example, the thread optimization component 124 can directly or indirectly (e.g., via the data repository 129) provide at least a portion of the single thread that indicates the third (or any other) action to the content selector component 125. The content selector component 125 can obtain this information from the data repository 129, where it can be stored as part of the content data 132. The indication of the third action can inform the content selector component 125 of a need for transportation from the location of the movie theater to a location as determined or indicated by the client computing device 134, such as a ride to an end destination.

The content selector component 125 can obtain indications of a later action in the thread prior to the occurrence of at least one earlier action. For example, the content selector component 125 can receive an indication of the third action (e.g., a need for a ride from the movie theater) before the movie plays in the theater (second action), or before the person who input the input audio signal into the client computing device 134 eats dinner at the restaurant (first action). The content selector component 125 can obtain indications of at least one action of the thread before completion of at least one action of the thread.

From the information received by the content selector component 125, e.g., an indication of the third action before occurrence of at least one prior action in the sequence dependent thread, the content selector component 125 can identify at least one content item. The content item can be responsive or related to the third (or any other) action. For example, the content item can include an audio message offering services of a car share company, responsive to the third action that indicates a transportation need. The content selector component 125 can query the data repository 129 to select or otherwise identify the content item, e.g., from the content data 132. The content selector component 125 can also select the content item from the content provider computing device 139. For example, responsive to a query received from the content distribution system 110, the content provider computing device 139 can provide a content item to the content distribution system 110 (or component thereof) for eventual output by the client computing device 134.

The audio signal generator component 126 can generate or otherwise obtain an output signal that includes the content item responsive to the third (or any other) action. For example, the content distribution system 110 can execute the audio signal generator component to generate or create an output signal corresponding to the content item. The interface 123 of the content distribution system 110 can provide or transmit one or more data packets that include the output signal via the computer network 102 to the client computing device 134, e.g., as part of the communication session. The interface 123 can be designed, configured, constructed, or operational to receive and transmit information using, for example, data packets. The interface 123 can receive and transmit information using one or more protocols, such as a network protocol. The interface 123 can include a hardware interface, software interface, wired interface, or wireless interface. The interface 123 can facilitate translating or formatting data from one format to another format. For example, the interface 123 can include an application programming interface that includes definitions for communicating between various components, such as software components of the system 100.

For example, the content distribution system 110 can provide the output signal from the data repository 129 or from the audio signal generator component 126 to the client computing device 134. The content distribution system 110 can also instruct, via data packet transmissions, the content provider computing device 139 or the service provider computing device 108 to provide the output signal to the client computing device 134. The output signal can be obtained, generated, transformed to or transmitted as one or more data packets (or other communications protocol) from the content distribution system 110 (or other computing device) to the client computing device 134.

The content selector component 125 can skip to a later action in a set of sequence dependent operations indicated by the single thread to select a content item for the later action prior to occurrence (and prior to an immediate need) for activity corresponding to the later action. By skipping to a later sequenced action, e.g., to select a content item for the second subsequent action prior to selecting a content item for a first prior action, the content distribution system 110 is not required to first process information related to the prior action to select content items for subsequent actions. This reduces processor utilization, power consumption and bandwidth from data transmissions that would otherwise be associated with selecting a content item (for the first action) prior to selecting the content item for the second action.

The content selector component 125 can select the content item for the (subsequent or later) action as part of a real-time content selection process. For example, the content item can be provided to the client computing device for transmission as audio output in a conversational manner in direct response to the input audio signal. The real-time content selection process to identify the content item and provide the content item to the client computing device 134 can occur within one minute or less from the time of the input audio signal and be considered real-time.

The output signal that corresponds to the content item corresponding to the content provider computing device 139 (or data corresponding to the service provider computing device 108), for example obtained or generated by the audio signal generator component 126 transmitted via the interface 123 and the computer network 102 to the client computing device 134, can cause the client computing device 134 to execute the audio driver 137 to drive the speaker 138 to generate an acoustic wave corresponding to the output signal. The acoustic wave can include words of or corresponding to the content item or other data for the later, (e.g., second or third) action. The output signal that corresponds to the content item can also include non-audio content items that render on the client computing device 134 that is the source of the input audio signal or on a different client computing device 134 (e.g., a wearable device computing device) as text or image messages that can render without audio elements.

The content distribution system 110 can provide the output signal that includes the content item or other data responsive to an action in direct or real-time response to the input audio signal so that the packet based data transmissions via the computer network 102 that are part of a communication session between the content distribution system 110 and the client computing device 134 has the flow and feel of a real-time person to person conversation. This packet based data transmission communication session can also include the content provider computing device 139 or the service provider computing device 108.

The content selector component 125 can select content items provided in response to the second (or any non-first) action in the sequence dependent set of actions before selecting any content item for any prior action in the sequence. This avoids the need to process at least some of the data corresponding to the prior actions, which causes the second content item to be selected with a reduced number of processing operations than would occur if the content items were selected in an order that matches the order of the sequence of actions. Content items for the prior (e.g., first and second) actions may or may not be selected, for example after selection of the content item for the second action.

The content selector component 125 can select the content item (e.g., for the second action) based on at least one trigger keyword of the thread that indicates subject matter different than subject matter of the one or more requests of the same thread. For example, the requests of the single thread can indicate subject matter of a dinner request (first action), and subject matter of a movie request (second action). This subject matter does not indicate any transportation request. However, the NLP component 122 or the thread optimization component 124 (or other content distribution system 110 components executing as part of the direct action API 127) can identify the trigger keyword "go" "go to" or "to go to" and can determine a transportation request based at least in part on the trigger keyword. Thus, the content distribution system 110 can infer actions from the input audio signal that are secondary requests that are not the primary request or subject of the input audio signal.

The content distribution system 110 can prevent or delay transmission of the output signal that includes the content item. For example, the interface 123 or a script executing via the direct action API 127 can prevent transmission of data packets that include the output signal corresponding to a content item or to an action of the single thread until a triggering event. The triggering event can include expiration of a pre-determined time period, such as two hours or a time coinciding with occurrence of an earlier action in the thread, such as a scheduled end time of a movie. The triggering event can also include an authorization indication received by the content distribution system 110 from the client computing device 134. The authorization indication can originate as a subsequent audio input associated with the thread but received by the content distribution system 110 subsequent to the input audio signal, a text-based or other non-audible signal, or can include an indication of a setting of the client computing device 134 that authorizes receipt by the client computing device 134 of content items.

The content distribution system 110 can also delay transmission of the content item associated with a second or subsequent to second action of the thread to optimize processing utilization. For example, the content distribution system 110 can delay content item transmission until an off-peak or non-peak period of data center usage, which results in more efficient utilization of the data center by reducing peak bandwidth usage, heat output or cooling requirements. The content distribution system 110 can also initiate a conversion or other activity associated with the content item, such as ordering a car service, based on data center utilization rates or bandwidth metrics or requirements of the network 102 or of a data center that includes the content distribution system 110.

The content items can correspond to the actions of the thread, and the content selector component 125 can select a content item for one, more than one, or all actions of the thread. The thread optimization component 124 can identify the sequence dependent thread of actions of, for example, "dinner" (first action) "movie" (second action) and "transport from movie location" (third action).

For example, based on the single thread, the content item for the third action can be provided for rendering at the client computing device 134 as an audio response that states, "Would you like a ride home from the movie theater?" in response to the audio input signal. Subsequent or prior to this rendering, the content distribution system 110 can select or provide a content item, e.g., "the Italian restaurant downtown has an opening for 7 pm tonight—are you interested?" for the first action (dinner), and can select or provide another content item, e.g., "would you like tickets to the 9 pm movie at the downtown theater?" for the second action (movie). The content distribution system 110 can provide (which includes instructing the content provider computing device 139 to provide) these content items responsive to the input audio signal for rendering by the client computing device 134 as audio output content items. The content distribution system 110, via the interface 123, can select or provide these content items in any order to the client computing device 134. For example, the content item for the third (e.g., last) action can be selected or provided first, before content items corresponding to other, earlier actions of the thread.

The content distribution system 110 can receive a response to the content item "would you like a ride home from the movie theater?" The response can include an input audio signal, e.g., "yes please" that was entered into the client computing device 134 by the end user and received by the content distribution system 110. The content distribution system 110 or component thereof (e.g., the thread optimization component) can include the response as part of the single thread. Based on this response, the direct action API 127 can communicate with the service provider computing device 108 (that can be associated with the content item, such as a car share company) to order a taxi or ride share vehicle for the location of the movie theater at the time the movie ends. The content distribution system 110 can obtain this location or time information as part of the data packet (or other protocol) based data message communication with the client computing device 134, from the data repository 129, or from other sources such as the service provider computing device 108 or the content provider computing device 139. Confirmation of this order (or other conversion) can be provided as an audio communication from the content distribution system 110 to the client computing device 134 in the form of an output signal from the content distribution system 110 that drives the client computing device 134 to render audio output such as, "great, you will have a car waiting for you at 11 pm outside the theater." The content distribution system 110, via the direct action API 127, can communicate with the service provider computing device 108 to confirm the order for the car.

The content distribution system 110 can obtain the response (e.g., "yes please") to the content item ("would you like a ride home from the movie theater?") and can route a packet based data message to the service provider NPL component 141 (or other component of the service provider computing device). This packet based data message can cause the service provider computing device 108 to affect a conversion, e.g., to make a car pick up reservation outside the movie theater. This conversion—or confirmed order— (or any other conversion of any other action of the thread) can occur prior to completion of one or more actions of the thread, such as prior to completion of the movie, as well as subsequent to completion of one or more actions of the thread, such as subsequent to dinner.

Based on a response to a content item for a subsequent action in the thread, such as the response "yes please" to the content item "would you like a ride home from the movie theater" for the third and last action in a sequence dependent thread, the content distribution system 110 can initiate a conversion or action. This can occur before the end user has begun any activities associated with the thread, e.g., before dinner or before the movie is over.

Processors of the content distribution system 110 can invoke the direct action API 127 to execute scripts that order a car from a car share service. The direct action API 127 can obtain content data 132 (or parameters 130 or policies 131) from the data repository 129, as well as data received with end user consent from the client computing device 134 to determine location, time, user accounts, logistical or other information in order to reserve a car from the car share service. Using the direct action API 127, the content distribution system 110 can also communicate with the service provider computing device 108 to complete the conversion by in this example making the car share pick up reservation.

The direct action API 127 can initiate the conversion or activity to accomplish an action of the thread at any time during a time period from receipt by the content distribution system 110 of the first input audio signal associated with the thread, (e.g., "OK, I would like to go to go dinner and then a movie tonight") until a threshold time period subsequent to completion of one of the actions of the thread, (e.g., until 15 minutes after the end of the second action of watching the movie). The content distribution system 110 can also determine the end of this time period based on other factors, such as an indication that the end user has completed the actions of the thread, e.g., has returned home or is no longer located at the movie theater. The content distribution system 110 can also obtain an indication from the client computing device 134 (a data message transmitted via the network 102) that the thread is cancelled or dormant or that the end user has cancelled or completed actions of the thread.

The direct action API 127 can initiate the conversion or activity to accomplish an action of the thread based on completion or time of completion of other actions of the thread. For example, the content distribution system 110 can order a good or service (car share pick-up) directly or by communicating with the service provider computing device 108 within a threshold time period of a conclusion of a prior action in the thread. Within 5 minutes (or other time period) prior or subsequent to the scheduled or actual conclusion of the movie (second action), the content distribution system 110 can confirm or order a car share service to send a car to pick up the end user at the movie theater (subsequent, third action). This can occur in the absence of input received from the end user computing device 134 during this time period, or responsive to a prompt received from the end user computing device 134 during this time period.

The direct action API 127 can initiate the conversions or other activity associated with the sequence dependent operations of the thread in any order. For example, the direct action API 127 (or other content distribution system 110 component) can initiate activity corresponding to a final action (e.g., the third action in a three action thread such as ordering a taxi) prior to initiating activity corresponding to an earlier thread in the sequence, (e.g., prior to making a dinner reservation or prior to ordering movie tickets). In this example, the content distribution system 110 initiates activity for an earlier (e.g., second) action subsequent to initiation of activity for the later (e.g., third) action.

The content selector component 125 can identify, select, or obtain multiple content items resulting from a multiple content selection processes. The content selection processes can be real-time, e.g., part of the same conversation, communication session, or series of communications sessions between the content distribution system 110 and the client computing device 134 that involve a thread. The conversation can include asynchronous communications separated from one another by a period of hours or days, for example. The conversation or communication session can last for a time period from receipt of the first input audio signal until an estimated or known conclusion of a final action of the thread, receipt by the content distribution system 110 of an indication of a termination of the thread. This can be referred to as the active time period of the thread. For example, for a thread with three actions (e.g., dinner, move, and transport home), the content selector component 125 can select at least one content item for each action. The content item selector component 125 can run or obtain results from a different content selection process for each action. In the content selection processes the content provider computing device 134 can set forth content items for selection by the content selector component 125. For a thread with at least three actions, the content item selector component can select or otherwise identify a first content item for the first action via a first content selection process, a second content item for the second action via a second content selection process, and a third content item for the third action via a third content selection process. The content distribution system 110 that provides these content items for rendering by the client computing device 134 during the active time period of the thread can be considered to be operating in real-time. In this example, the content selection processes and rendering of the content items occurs in real time.

The content distribution system 110 can cancel actions associated with content items. For example, after ordering the car service the end user may watch the movie but then decide to walk home, or to have desert after the movie instead of taking a car home. An app or other program executing at the client computing device 134 as part of the content distribution system 110 can receive an input audio signal of "cancel my ride home". The NLP component 122 can receive this input audio signal, for example as one or more packet based data messages, and can determine that this input audio signal relates to a pre-existing thread (e.g., dinner, movie, transport home) and is part of the same conversation or communication. For example, the NLP component 122 (or other content distribution system 110 component) can evaluate time data, location data and pre-existing thread data such as past, present, or scheduled actions of a thread from the content data 132 of the data repository 129 to determine that an input audio signal relates to a pre-existing thread. Based, for example, on the request "ride" or the trigger keyword "cancel" the NLP component 122 can determine that the input audio signal "cancel my ride home" relates to the content item "would you like a ride home from the movie theater?" that corresponds to the third action of a pre-existing thread. The direct action API 127 (or other component) can cause the content distribution system 110 to communicate via the interface 123 with the service provider computing device 108 to cancel the order for the taxi or car share service to have a car waiting for the end user outside the movie theater upon conclusion of the movie.

The NLP component 122 can receive the data packet or other protocol based message to cancel an action of the thread prior to or subsequent to completion of any action of the thread. The NLP component 122 can receive from the client computing device 134 (or obtain from the data repository 129) a data message (inbound audio signal) to cancel an action of the thread within a time interval triggered by an earlier action of the thread. For example, in a sequence dependent thread with three actions, dinner, movie, transport, the content distribution system 110 can receive the transport cancellation data message within 5 minutes (or other time period) of the conclusion of the movie. The content distribution system 110 can prompt for confirmation of a product or service related to an action of the thread. For example, during a time period between the first action and the second action (e.g., after dinner and before the movie) the content distribution system 110 can transmit a data message to the client computing device 134 that, when rendered at the client computing device 134 outputs the audio or text message stating "just confirming that you still want a car waiting for you after the movie." The content distribution system 110 can receive a response, e.g., "yes, confirmed" or "no, cancel the car". This response can be included as part of the thread. The direct action API 127 can execute scripts to process this information and can communicate with the service provider computing device 108 to indicate the confirmation or the cancellation.

Figure 2:
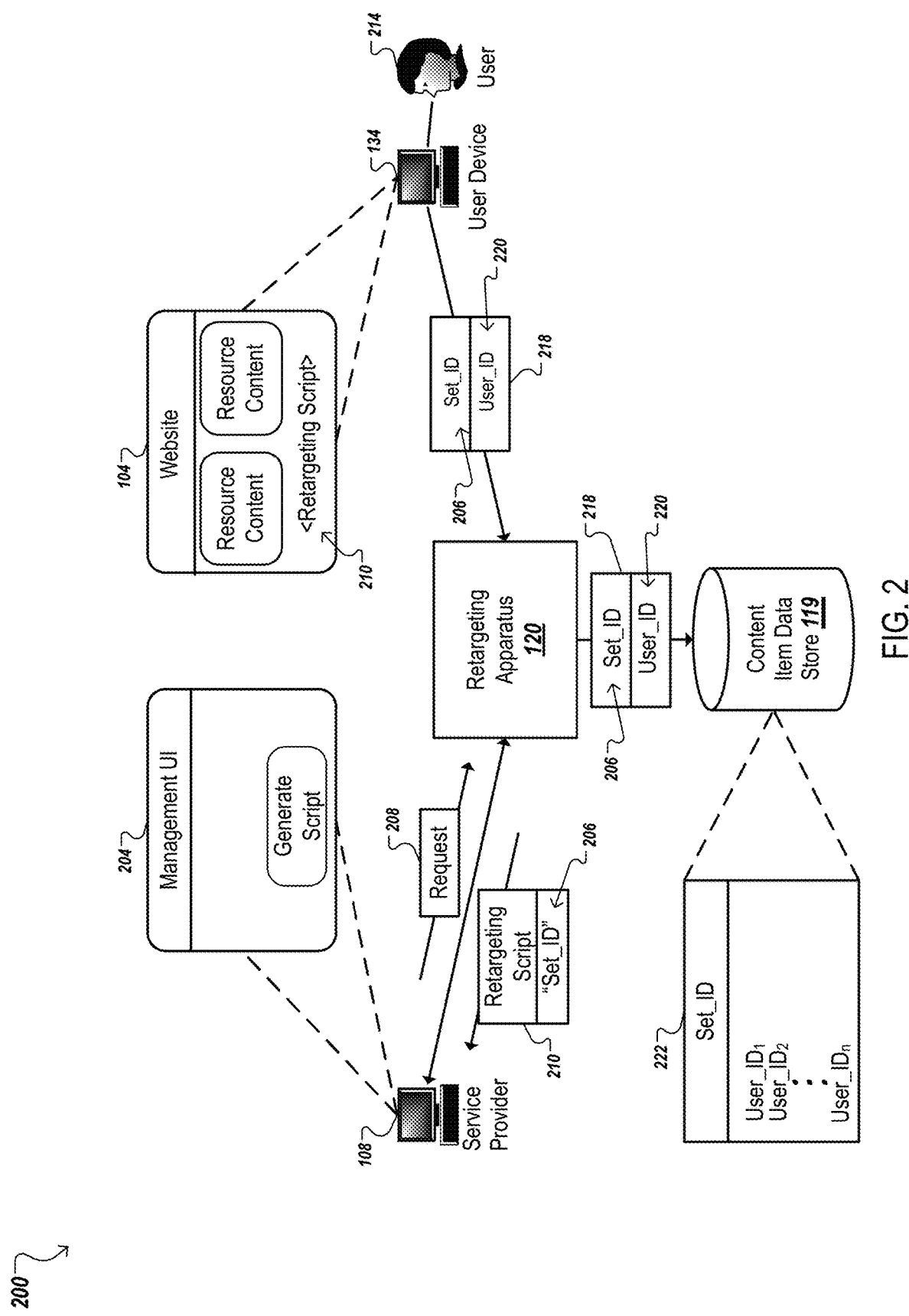
FIG. 2 is an illustration of an example data flow for populating a retargeting set.

FIG. 2 is an illustration of an example data flow 200 for populating a retargeting set. A content item provider, such as a service provider 108, can create, or request creation of, a retargeting set 222, for example, through a digital component management user interface (UI) 204 that is accessed using a computer 203. For example, a service provider can access the digital component management user interface 204 and submit a request 208 for a retargeting script 210, for a retargeting set.

The request 208 can be submitted to the retargeting apparatus 120 in response to the service provider 108 interacting with (e.g., clicking) a "request script" user interface element 203. In response to the request 208, the retargeting apparatus can generate the retargeting script 210 for the retargeting set 222 and provide the retargeting script 210 to the service provider 108. In some implementations, the service provider 108 can create the retargeting script 210 and submit the retargeting script 210 to the retargeting apparatus 120.

The retargeting script 210 can include a set identifier 206 (e.g., "Set_ID"). The set identifier 206 can be, for example, a unique character string that is indicative of the retargeting set 222 with which the retargeting script 210 is associated. The set identifier 206 can be a name that the service provider 108 has specified for the retargeting set 222 or a set of characters that the retargeting apparatus 120 has assigned to the retargeting set 222.

The service provider can include the retargeting script 210 in the code of one or more of the service provider's web pages 212. The retargeting script 210 is executed in response to the performance of a target user interaction. In some implementations, the target user interaction can occur when a user requests the web page 212 that includes the retargeting script 210. For example, the service provider 108 could embed the retargeting script 210 in the web page 212 such that the script is executed when the web page 212 is rendered at a user's device 216 (i.e., in response to the request for the web page).

In some implementations, the target user interaction can occur when the user 214 interacts with (e.g. clicks) a portion of the service provider's webpage 212. For example, the service provider 108 could embed the retargeting script 210 in the web page such that user interaction with a particular user interface element (e.g., a particular button or tab) causes execution of the retargeting script 210.

Execution of the retargeting script 210 causes the user device 216 to submit interaction data 218 to the retargeting apparatus 120. The interaction data 218 includes a user identifier 220 associated with the user device 216, such as the character string "User_ID". The interaction data 218 may also include the set identifier 206 for the retargeting set with which the retargeting script 210 is associated.

The retargeting apparatus 120 receives the interaction data 218 and adds the user identifier 220 to the retargeting set associated with the set identifier 206. The retargeting apparatus 120 may store the retargeting set in the content item data store 119 or another data store. The interaction data 218 can be stored with a reference to (e.g., indexed according to) the set identifier 206 to facilitate identification of the retargeted identifiers that have been added to each retargeting set.

Figure 3:
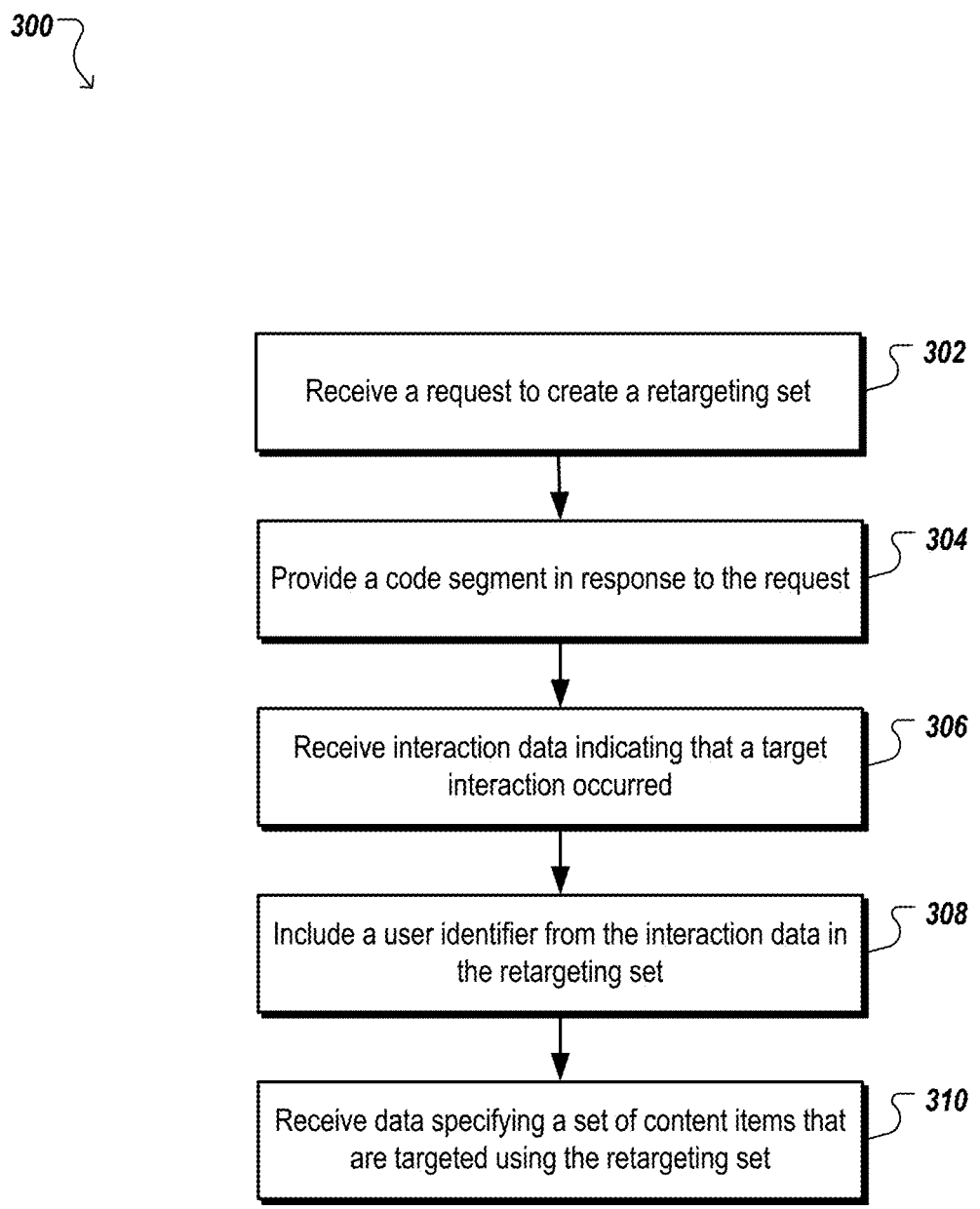
FIG. 3 is a flow chart of an example process for populating a retargeting set.

FIG. 3 is a flow chart of an example process 300 for populating a retargeting set. The process 300 is a process by which a retargeting script can be provided in response to a request to create a retargeting set. As described above, the retargeting script can be embedded in a web page such that performance of a target user interaction causes execution of the retargeting script, which in turn, causes interaction data to be generated. The interaction data are received, and a user identifier that is included in (or referenced by) the interaction data is added to a retargeting set that is also referenced (e.g., by way of a set identifier) by the interaction data. In some implementations, the retargeting set is associated with one or more content items (e.g., digital components) such that the eligibility of the content items for presentation in response to a content item request is conditioned on the request including a user identifier that is included in the retargeting group.

The process 300 can be implemented, for example, by the retargeting apparatus 120 or another data processing apparatus. In some implementations, the retargeting apparatus 120 is a data processing apparatus that includes one or more processors that are configured to perform actions of the process 300. In some implementations, a non-transitory computer readable medium can include instructions that when executed by a data processing apparatus cause the data processing apparatus to perform actions of the process 300.

A request to create a retargeting set is received (302). The request can include (or reference), for example, a name for the retargeting set. For example, if the retargeting set is being created to identify users that have viewed the service provider's DVD page (e.g., a web page that provides information about DVD players) the name of for the retargeting set may be "DVD page."

The request can include expiration data indicating when user identifiers are to be removed from the retargeting set. In some implementations, the expiration data specify a maximum amount of time that a particular retargeted identifier may remain in the retargeting set. For example, the service provider may specify that each retargeted identifier that is added to the retargeting set may only remain in the retargeting set for 14 days after being added to the set. In this example, if a particular retargeted identifier is added to the retargeting set on April $1^{st}$, that particular retargeted identifier will be removed from the retargeting set no later than April $15^{th}$.

In some implementations, the expiration data specify a rate at which retargeted identifiers are removed from the retargeting set. For example, if the expiration data specify that retargeted identifiers should be removed from the retargeting set every 10 days, some or all of the retargeted identifiers that are included in the retargeting set can be periodically removed every 10 days. The portion of the retargeted identifiers that are removed from the retargeting set can be limited to those retargeted identifiers that have been in the retargeting set for more than a pre-specified period of time (e.g., 2 days). Alternatively (or additionally), the expiration data can specify a maximum number (e.g., 10,000) of retargeted identifiers that can be included in the retargeting set. When the maximum number of retargeted identifiers has been reached, an oldest retargeted identifier in the retargeting set can be removed when a next retargeted identifier is added to the retargeting set.

An empty retargeting set can initially be created based on the information included in the request, and the empty retargeting set can be populated with user identifiers for users that perform a target interaction, as described below. The retargeting set may be associated with a set identifier that is used to distinguish the retargeting set from other retargeting sets. For example, when the retargeting set is created, a pseudo-random character string can be associated with the retargeting set, and the retargeting set can be identified using the pseudo-random character string.

A code segment is provided in response to the request (304). In some implementations, the code segment is a retargeting script that upon execution causes a browser to transmit interaction data to a server. As described above, the interaction data indicate that the retargeting script was executed by the browser. The interaction data can include a user identifier for the user device at which the code segment was executed.

In some implementations, execution of the code segment is caused by the performance of a target user interaction such that the interaction data indicates that the target interaction occurred. a service provider can select the target user interaction and embed the code segment into one or more web pages in a manner that causes execution of the code segment when the user performs the target user interaction. For example, if the target user interaction is selected by a service provider to be a request by a user device of a particular web page, the service provider can embed the code segment in the web page in a manner that causes the code segment to be executed when the web page is rendered by the browser. Similarly, if the target user interaction is selected to be user interaction with a particular user interface element (e.g., a "share this" or "more information" user interface element) the code segment can be embedded in the web page in a manner that causes the code segment to be executed in response to user interaction with the user interface element.

Interaction data are received (306). In some implementations, the interaction data that are received are considered an indication that a target user interaction occurred. The interaction data can be received, for example, by a retargeting apparatus (e.g., retargeting apparatus 120 of FIGS. 1 and 2). The interaction data can include a user identifier for a user device from which the interaction data was transmitted. For example, the interaction data can include a user identifier from a "cookie" that is stored at the user device. The cookie may be placed on the user device in response to execution of the code segment. Alternatively, the cookie may have been previously placed on the user device, and upon execution of the code segment the cookie was detected, and the user identifier from the cookie (or the cookie itself) was included in the interaction data.

The interaction data can also include a set identifier that indicates the retargeting set in which the user identifier is to be stored. In some implementations, the submitted interaction data includes a timestamp that can be used to determine an expiration time for the user identifier that is included in the interaction data. If temporal expiration data has been associated with the retargeting set in which the user identifier is included, the time at which the user identifier is removed from the retargeting set can be determined based on the time stamp and the expiration data. For example, if the expiration data indicates that user identifiers are to be removed from a retargeting set 14 days after being added to the retargeting set, a particular user identifier can be removed from the retargeting set when the difference between the time stamp and a current time is at least 14 days.

The user identifier from the interaction data is included in a retargeting set (308). In some implementations, the user identifier is included in the set of retargeted content items that is associated with the set identifier that is specified by the interaction data. For example, when the interaction data is received, the set identifier can be detected, and the user identifier from the interaction data can be stored with a reference to (e.g., indexed according to) the set identifier. Additionally, the timestamp that is included in (or received with) the interaction data can also be stored with the user identifier.

Data are received that specify a set of content items that are targeted using the retargeting set (310). In some implementations, the set of content items includes one or more digital components that are only eligible for presentation in response to determining that a user identifier that is included in (or referenced by) a content item request matches a user identifier in the retargeting set. For example, a service provider that has a particular set of digital components for DVD players may specify that the digital components are only eligible for presentation with a search results page if the user identifier received with the content item request matches a user identifier that is included in a retargeting set for users that viewed a DVD page on the service provider's website.

As described above, digital components can be organized in digital component groups, and targeting criteria (e.g., targeting keywords) can be specified on a per-digital component-group basis. In some implementations, a service provider may want to target a particular digital component group using targeting criteria other than a retargeting set (e.g., irrespective of whether the user identifier received with the search query matches a user identifier in a retargeting set), and also target the particular set of digital components using the targeting criteria and the retargeting set. For example, the service provider may be willing to pay a first price (e.g., $1 per click) for digital components that are provided in response to search queries that do not include a user identifier that matches a retargeted identifier in the retargeting set, but be willing to pay a second, possibly higher, price (e.g., $5 per click) for digital components that are provided in response to search queries that include a user identifier that matches a retargeted identifier in the retargeting set.

In these situations, the service provider can request that a copy of the particular digital component group be created, and then specify that the copy of the digital component group be targeted using a specified retargeting set. By specifying that the copy of the digital component group be targeting using the specified retargeting set, the digital components that are included in the copy of the digital component group will only be eligible for presentation if a digital component request (or another content item request) includes (or references) a user identifier that matches a retargeted identifier from a retargeting set. However, assuming that the initial instance of the digital component group is not targeted using a retargeting set, the bids for the digital components in the initial instance of the digital component group will be eligible for presentation irrespective of the user identifier that is included in the digital component request (i.e., assuming all of the other targeting criteria for the digital component group are satisfied). Thus, bids for the digital components in the copy of the digital component group will not be submitted to an auction unless the user identifier matches a retargeted identifier from the retargeting set, while the bids for the digital components in the initial instance of the digital component group will be submitted to the auction irrespective of the user identifier matching a retargeted identifier for the retargeting set.

In some implementations, a set of content items can be targeted using a Boolean combination of two or more retargeting sets. For example, the data received from a service provider may specify that a set of digital components are only eligible for presentation with a search results page if the user identifier received with a digital component request matches both a retargeted identifier from a first retargeting set and (e.g., Boolean AND) a retargeted identifier from a second retargeting set. As another example, the data received from a service provider may specify that a set of digital components are only eligible for presentation with the search results page if the user identifier received with a digital component request matches a retargeted identifier in one particular retargeting set, but is not included in a second different retargeting set.

For example, a service provider that sells computers and printers may not want to present a digital component for a computer to a user that has recently purchased a computer, but may want to present digital components for printers to users that have recently purchased a computer, but are not known to have purchased a printer. In this example, the service provider could provide data specifying that a digital component group that includes digital components for printers is to be eligible for presentation when the user identifier that is included in the digital component request includes a user identifier that matches a retargeted identifier in the retargeting set for users that purchased a computer, but is not included in a retargeting set for users that have purchased a printer. The data that are received from the service provider can also specify other combinations (e.g., AND, OR, NOR, or XOR) of retargeting sets in which a user identifier is to be included for a digital component to be eligible for presentation.

Service providers can also adjust bids that are associated with the copy of the digital component group. For example, a service provider can specify that the bid for the copy of the digital component group (i.e., the retargeted digital component group) have a higher bid (e.g., $5 per click) than the bid (e.g., $1 per click) for the initial instance of the digital component group (e.g., the keyword targeted digital component group). Service providers can further be allowed to change the creatives (e.g., the digital components that are presented) for the copy of the digital component group. For example, the service providers may include digital components for special offers (e.g., 10% discounts on products) in the retargeted digital component group, while the keyword targeted digital component group may include more general informational digital components that do not include special offers.

Figure 4:
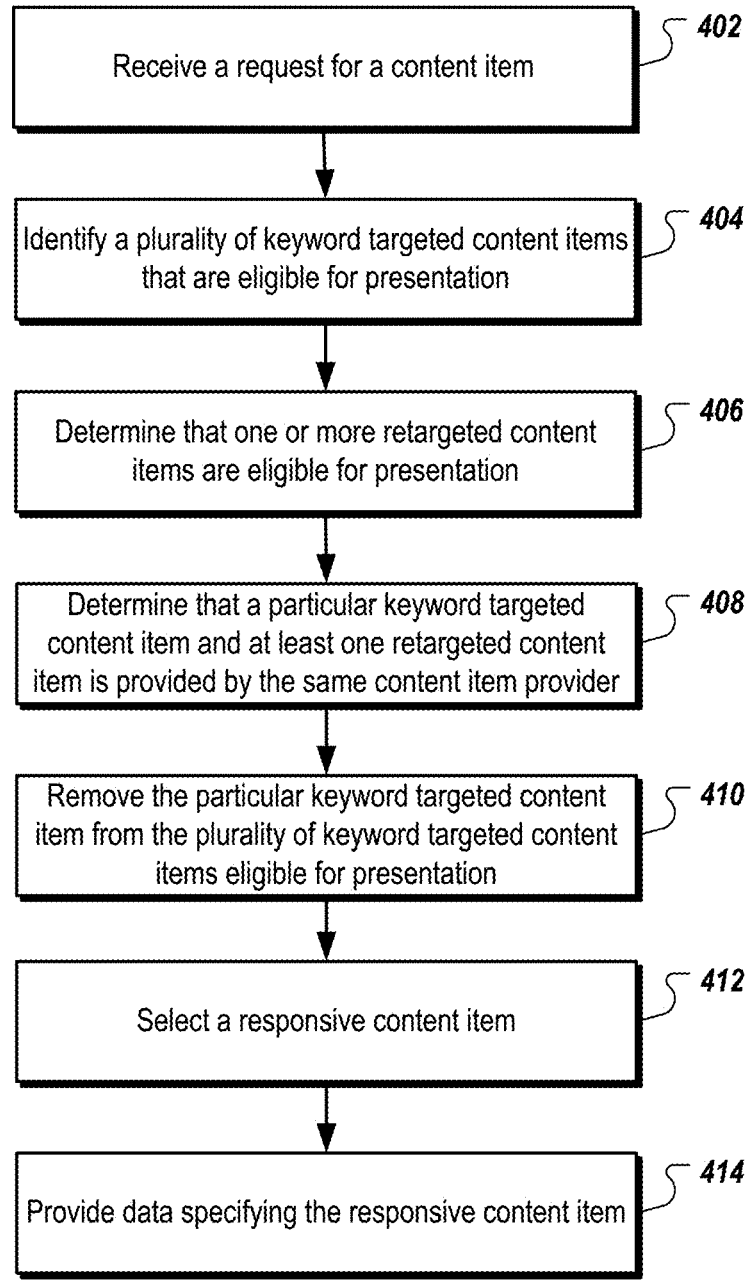
FIG. 4 is a flow diagram of an example process for providing retargeted content items with a search results page.

FIG. 4 is a flow diagram of an example process 400 for providing retargeted content items (e.g., digital components) with a search results page. The process 400 is a process by which one or more retargeted content items (and/or one or more keyword targeted content items) are determined to be eligible for presentation in response to a content item request. The retargeted content items that are determined to be eligible for presentation can be those retargeted content items that are targeted using a targeting keyword that matches a search query that is referenced by the content item request and that are also targeted using a retargeting set that includes a retargeted identifier that matches a user identifier (e.g., a cookie) that is referenced by the content item request. The keyword targeted content items can be eligible for presentation irrespective of the user identifier that is referenced by the content item request. A responsive content item that is to be provided in response to the content item request is selected based, in part, on bids that are associated with the eligible content items, and data specifying the responsive content item can be provided in response to the content item request.

The process 400 can be implemented, for example, by the retargeting apparatus 120 or another data processing apparatus. In some implementations, the retargeting apparatus 120 is a data processing apparatus that includes one or more processors that are configured to perform actions of the process 400. In some implementations, a non-transitory computer readable medium can include instructions that when executed by a data processing apparatus cause the data processing apparatus to perform actions of the process 400.

A request for a content item that is to be provided with a search results page is received (402). In some implementations, the request includes data indicating that a search query was submitted by a user device. The data can also include a user identifier for the user device that submitted the search query. For example, a content distribution system may receive a request to provide a digital component for presentation with a search results page. The request may include a search query (e.g., "DVD player") and a user identifier which identifies a computer (or other user device) from which the search query was submitted. The user identifier can be, for example, a user identifier (e.g., a cookie) that was placed on the user device when the retargeting script was executed or a user identifier that was placed on the user device prior to execution of the retargeting script, as described above with reference to FIG. 3 (e.g., 306).

A plurality of keyword targeted content items that are eligible for presentation with the search results page are identified (404). In some implementations, each eligible keyword targeted content item is a content item that is eligible for presentation based on the search query matching a targeting keyword for the keyword targeted content item. As mentioned above, for the purposes of this disclosure, the eligibility of a keyword targeted content item does not require that the user identifier referenced by the content item request match a retargeted identifier that is included in a set of retargeted identifiers. For example, assume that the search query submitted by the user is "DVD player." In this example, a keyword targeted digital component may be eligible for presentation based on "DVD player" matching a targeting keyword (for example, "DVD", "player", or "DVD player") for the keyword targeted digital component (i.e., irrespective of whether a user identifier is referenced by the content item request or whether a user identifier referenced by the content item request matches a retargeted identifier that is included in a retargeting set).

A determination is made that one or more retargeted content items are eligible for presentation with the search results page (406). In some implementations, each retargeted content item is a content item for which presentation eligibility is conditioned, at least in part, on a user identifier that is referenced by the content item request matching a retargeted identifier that is included in a retargeting set. The presentation eligibility of a retargeted content item can further be conditioned on a search query referenced by the content item request matching a targeting keyword for the retargeted content item.

For example, assume that a particular digital component is associated with the targeting keyword "DVD," and that the service provider has specified that the particular digital component is only eligible for presentation if the content item request includes a user identifier (e.g., identifier A) that matches a retargeted identifier (e.g., identifiers A, B, or C) in a specified retargeting set (e.g., a set of user identifiers for user devices that have requested a DVD page from the service provider's website). Further assume that a content item request that references the search query (e.g., "DVD") is received. In this example, a determination can be made that the search query matches the targeting keyword (e.g., "DVD"). However, in this example, the particular digital component will not be eligible for presentation in response to the content item request (e.g., on the search results page) unless it is further determined that the user identifier that is referenced by the content item request matches a retargeted identifier from the retargeting set.

As described above, a service provider can specify additional targeting criteria for digital components. For example, in addition to specifying that presentation eligibility for a digital component is conditioned on the user identifier that is included in the content item request matching a retargeted identifier that is in a particular retargeting set, a service provider can further specify that the user not match a non-targeted user identifier in a set of non-targeted identifiers. A non-targeted identifier is a user identifier for a user (or user device) that is used to prevent a digital component from being eligible for presentation.

For example, if a service provider that sells DVD players has recently (e.g., within 1 week) sold a DVD player to a particular user, the service provider may wish to prevent digital components for the DVD player to be provided to the user. In this example, the service provider may add the user identifier for the user to a set of non-targeted user identifiers (e.g., thereby identifying the user identifier as a non-targeted identifier) and specify that the digital components for the DVD players not be eligible for presentation when the user identifier that is included in the content item request matches a non-targeted identifier that is included in the set of non-targeted user identifiers.

In some implementations, retargeted content items that are eligible for presentation in response to content item request can be identified, for example, by first identifying a set of retargeting content items that are targeted using keywords that are matched by the search query. Once this set of retargeted content items has been identified, a further determination of whether additional targeting criteria for each of the retargeted content items can be made. For example, for each of the retargeted content items in the set, a determination can be made whether the user identifier that is included in the content item request matches a retargeted identifier that is included in a retargeting set with which the retargeted content item is targeted. If a match between the user identifier and the retargeting set for a particular retargeted content item is determined to not exist, the retargeted content item can be removed from (or prevented from inclusion in) a set of eligible retargeted content items for the content item request.

Note that in some implementations, retargeted content items and keyword targeted content items that that are targeted using keywords that match the search query can all be identified together based on their targeting keywords. The retargeted digital components can then be identified as such based on the retargeted digital components being further targeted using a retargeting set.

In some implementations, the retargeted content items that are determined to be eligible for presentation can be limited, for example, to retargeted content items that are targeted using retargeting sets that contain at least a pre-specified minimum number of retargeted identifiers. For example, each retargeted digital component that is eligible for presentation can be required to be targeted using retargeting sets that include more than 1,000 (or another threshold number of) unique retargeted identifiers in order to protect the privacy of users (e.g., in addition to using user identifiers that are identity neutral and do not contain personal information). If a particular retargeting set is determined to have fewer than the pre-specified minimum number of retargeted identifiers, the particular retargeting set can be disabled and/or content items that are eligible for presentation based on the particular retargeting set can be removed from the set of eligible retargeted content items.

A retargeted content item is removed from the plurality of content items eligible for presentation in response to determining that a user identifier matches a particular non-targeted user identifier in a set of non-targeted user identifiers. For example, if a user identifier matches a particular non-targeted user identifier in a set of non-targeted user identifiers for a retargeted digital component, the retargeted digital component may be removed from the set of digital components that are eligible for presentation with a search results page.

In some implementations, a determination is optionally made that a particular keyword targeted content item and at least one eligible retargeted content item are both provided by the same content item provider (408). For example, a content distribution system may determine that a particular keyword targeted digital component and at least one of the retargeted digital components are both provided by the same service provider. The determination can be made, for example, based on a determination that each of the keyword targeted content item and the retargeted content item are both identified as belonging to a same digital component management account. The determination can also be made, for example, based on the particular content item and the retargeted content item each being included in the same digital component campaign.

In response to determining that the particular keyword targeted content item and at least one of the eligible retargeted content items is provided by a same content item provider, the particular keyword targeted content item can be optionally removed from the plurality of keyword targeted content items that are eligible for presentation (410). For example, if a keyword targeted digital component and a retargeted digital component from a same service provider are both eligible for presentation, the keyword targeted digital component may be deemed ineligible, for example, so that bids for the digital components for which the service provider has provided more specific targeting criteria (e.g., retargeted content items) are used in the auction. This prevents a service providers two sets of digital components from competing in the auction. Other techniques for selecting eligible content items from among multiple sets of content items that are provided by a same service provider can also be used (e.g., selecting the set of digital components having a higher bid or higher historical performance measure).

A responsive content item to be presented with the search results page is selected (412). In some implementations, the responsive content item is selected based at least in part on bids that are associated with each of the keyword targeted content items that are eligible for presentation with the search results page and bids for each of the retargeted content items that are eligible for presentation with the search results page. For example, using the bids, a content distribution system may conduct an auction to select a digital component to be presented with the search results page. The winner of the auction (i.e., the digital component that is selected) may be the keyword targeted digital component or retargeted digital component with the highest auction score. The auction score may be based on the bid and/or digital component quality measures associated with each digital component.

Data specifying the responsive content item is provided (414). For example, a content distribution system may provide data specifying a network location from which the winning digital component can be obtained by the user device. Alternatively, the digital component itself can be provided to the user device in response to the request.

Figure 5:
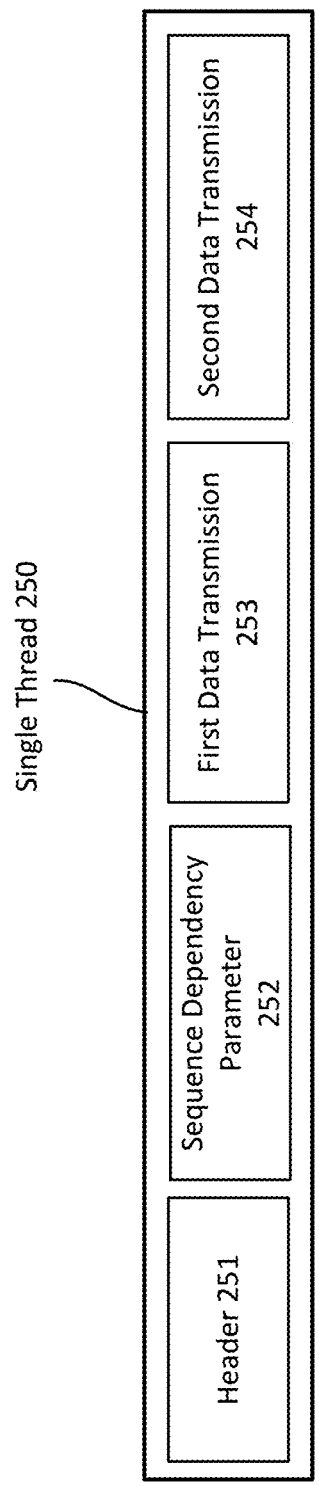
FIG. 5 depicts a functional diagram of a single thread structure for a voice activated data packet based computer network environment.

Referring to FIG. 1B and FIG. 5, among others, based on the sequence dependency parameter, the thread optimization component 124 can create at least one single thread data structure 250. The single thread data structure 250 can include a packet based architecture (or other format) and can include at least one header 251. The header 251 can include supplemental data identifying the content distribution system 110, source or destination address information, governing protocol information, IP addresses, frame synchronization data, size data, resolution data, or metadata associated with action data structures. The payload or body of the single thread data structure 250 can include at least one sequence dependency parameter 252, or other information such as at least one first data transmission 253 or at least one second data transmission 254. The single thread data structure 250 can include one or more than one structures, e.g., multiple packets having respective headers 251 and payloads indicating at least part of the first data transmission 253 or the second data transmission 254. The sequence dependency parameter 253 can indicate a sequence dependency of actions from the plurality of actions indicated by the first data transmission 253 or the second data transmission 254.

The header 251, sequence dependency parameter 252, first data transmission 253, and the second data transmission 254 may but need not be included in the single thread data structure 250. For example, the body of the single thread data structure 250 can include only the first data transmission 253 (or portion thereof) and not include any of the sequence dependency parameter 252 or the second data transmission 254, or the body of the single thread data structure 250 can include the sequence dependency parameter 252 as well as one or more of the first data transmission 253 and the second data transmission 254. The single thread data structure 250 can include one or more individual packets transmitted separately in sequence or parallel as part of one or more data transmissions between the content distribution system 110 and the service provider computing device 108 or the content provider computing device 139. The header 251 or the sequence dependency parameter 252 can indicate that the separate transmissions or separate data packets are associated with the same batch transmission, e.g., the same overall single thread data structure 250. The direct action API 127 can merge or otherwise link together multiple different single thread data structures into one single thread data structure 250. The single thread data structure 250 can include multiple packets or multiple different structures that are separate but associated with one another.

The thread optimization component 124 can prioritize one action of the single thread data structure 250 over another action. The prioritization can be indicated by the sequence dependency parameter 252 or otherwise provided to the direct action API 127 or the content selector component 125. For example, the thread optimization component 124 can prioritize a first in time action indicated by the single thread data structure 250. Responsive to the prioritization, the direct action API 127 or other component such as the content selector component 125 can provide data transmissions (e.g., at least part of the first data transmission 253 or the second data transmission 254) to the content provider computing device 139 or to the service provider computing device 108 to effect a conversion related to the first in time action.

Figure 6:
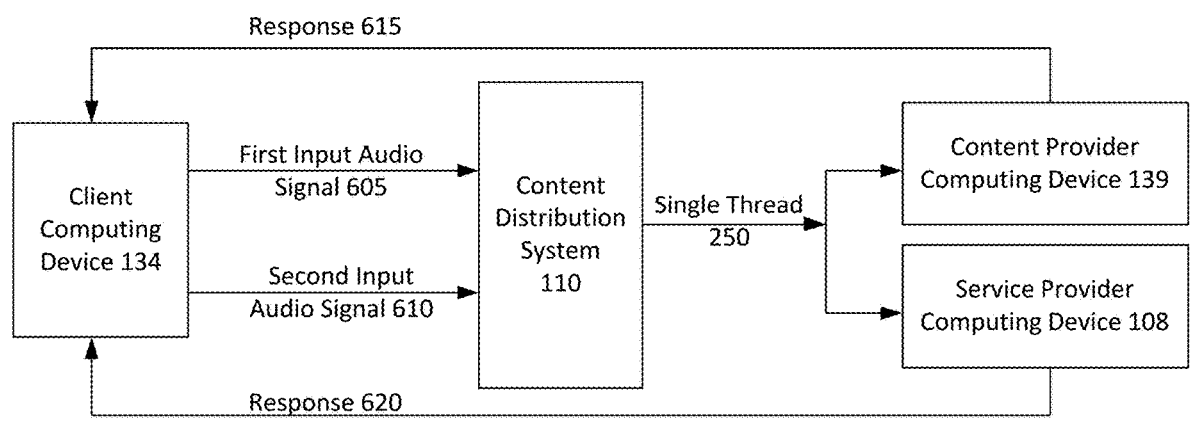
FIG. 6 depicts a functional diagram of thread data structure generation and communication between remote data processing systems and service provider computing devices in a voice activated data packet based computer network environment.

Referring to FIG. 6, among others, the content distribution system 110 can receive, from a first client computing device 134, the first input audio signal 605, (e.g., "OK, I would like to go to go dinner tonight"). The content distribution system 110 can also receive, from the same or a different client computing device 134, the second input audio signal 610, (e.g., "OK, I would like to catch a movie later"). The content distribution system 110 can generate respective action data structures and corresponding data transmissions for the first and second audio input signals 605, 610. content distribution system 110 components such as the thread optimization component 124 can apply statistical or heuristic techniques to the first input audio signal 605 and the second input audio signal 610 to generate at least one sequence dependency parameter indicative of sequence dependent actions from among the actions of the first input audio signal 605 and the second input audio signal 610. The content distribution system 110 can batch or pool the data transmission (e.g., packets) or the action data structures corresponding to the first input audio signal 605 and the second input audio signal 610 to create the batched or pooled single thread data structure 250. The content distribution system 110 can transmit or otherwise provide the single thread data structure 250 to the service provider computing device 108 for processing by the service provider computing device 108 to, for example reserve at least one car, purchase movie tickets, or make a dinner reservation responsive to the first and second input audio signals 605, 610.

Different instances of portions of the same single thread data structure can be provided to different computing devices. For example, all or some of the single thread 250 can be provided to a service provider computing device 108 to effect a conversion, e.g., order a car from a car share service, and the same or different portions of the single thread 250 can be provided (simultaneously is sequentially) to a content provider computing device 139 to effect another conversion, e.g., obtain a content item for a restaurant.

Responsive to receipt of the single thread data structure 250, the content provider computing device 139 or the service provider computing device 108 can perform at least one operation defined or indicated by the single thread data structure 250. The operation can correspond to one or more of the respective actions of the action data structures (or data transmissions) of the first or second input audio signals 605, 610. For example, the operations can include reserving a car from a car share service, from the service provider computing device 108, or providing a content item for a movie. For example, the content provider computing device 139 can provide a first response 615 (e.g., a content item for a movie) to the client computing device 134, and the service provider computing device 108 can provide a second response 620 (e.g., to reserve a car) to the same or a different client computing device 134. The first and second responses 615, 620, can bypass the content distribution system 110 during transmission from the content provider computing device 139 or the service provider computing device 108 to the client computing device 134. The responses 615, 620, can include text, image, or other data messages (including audio) that confirm a conversion action, such as a reservation for a car from a car service or rending of a content item. The content distribution system 110 can receive an indication of the conversion (or of the responses 615, 620) via the computer network 102 from the service provider computing device 108, the content provider computing device 139, or from the client computing device 134.

The single thread 250 created by the content distribution system 110 (e.g., by the thread optimization component 124 or the direct action API 127) can indicate an actual, known, scheduled, or estimated time of actions that correspond to the thread. These times can include movie start times, transport pick up times, dinner reservation times, or event times, among others. The times can be discrete times, e.g., 8:00 pm dinner reservations, or relative times relative to other actions, e.g., the action 'B' is scheduled to begin 15 minutes after the known or estimated conclusion time of action 'A'. For example, the thread 250 can indicate that a first action (e.g., eating dinner) is scheduled to occur prior to a second action (e.g. watching a movie). These actions can correspond to data structure (or data transmission) actions identified from input audio signals. The direct action API 127 can detect the completion of a first action. For example, the computing device 134 can execute a script to pay the bill at the restaurant, or the direct action API 127 can estimate that dinner will last for 90 minutes, or the end user can provide an audio input signal or other data message to indicate that the first action is complete or scheduled for completion at a time or within a time window. Responsive to detection of completion (e.g., a known or estimate end time) of a first action, the direct action API 127 can proceed to transmit data packets of the single thread to a service provider computing device 108 or to a content provider computing device 139. This transmission can occur subsequent to known or estimated completion of the first action, or during a time window, (e.g., within one hour) of known or estimated completion of the first action. For example, upon completion of dinner, the direct action API 127 can provide at least part of the single thread 250 to a service provider computing device 108 to purchase movie tickets, or to a content provider computing device 139 to obtain a content item for a movie. Indications of the conversions (e.g., purchase of the tickets or rendering of the content item at the client computing device 134) can be provided to the content distribution system 110 from the client computing device 134, the content provider computing device 139, or the service provider computing device 108. The sequence dependency parameter 252 can indicate the order in which actions of the single thread 250 are scheduled to occur, e.g., can indicate that a first action is scheduled to occur prior to a second action.

The direct action API 127 can identify at least one deadlock condition of at least one action of the single thread 250. A deadlock condition can indicate that a second action cannot proceed until after a first, prior action is complete. For example, the direct action API 127 can identify a deadlock condition when the first action is a movie action (watching a movie in a theater) and a second action is transport home via a car share service after the movie is over. The direct action API 127 can determine a deadlock condition for the second action (e.g., the ride home) that lasts until a time associated with the first action, such as a scheduled end time of the movie. The direct action API 127 or other component such as the interface 123 can prevent transmission of the data transmission to a service provider computing device (e.g., a car share service) responsive to the deadlock condition. For example, the content distribution system 110 or component thereof can prevent transmission of data packets of the data transmission (or data structure) for the action (e.g., to reserve a car) to a service provider computing device 108 (e.g., of a car share service) during the time period of the deadlock condition. This prevents the service provider computing device 108 from receiving the request for a car (or other service) too early.

The direct action API 127 can obtain an indication or otherwise determine that the deadlock condition has terminated or no longer exists. For example, the direct action API 127 can query the service provider computing device 108 or other third party computing device to determine a scheduled end time of a movie or other action. Upon arrival of this time, or within a threshold time period (e.g., 30 minutes or 5 minutes) in advance of this time the direct action API can break, release, or terminate the deadlock condition. Subsequent to expiration of the deadlock condition the content distribution system 110 can transmit (e.g., via the interface) to the service provider computing device 108 data of the data transmission or data structure corresponding to a subsequent action such as a ride home after the movie.

The direct action API 127 can receive an indication form the client computing device 134 to terminate the deadlock condition. For example, the end user may decide to leave the movie early, before the movie is finished, and can enter an input audio signal into the client computing device, e.g., "OK, this movie stinks, I'd like a ride home please". The content distribution system 110 (e.g., the NLP component 122 or the direct action API 127) can determine from this input audio signal that the deadlock condition has expired, and can transmit data for the subsequent action to the service provider computing device 108. Subsequent to release of the deadlock condition the direct action API 127 can also provide data for an action (e.g., data of a data transmission or action data structure of the single thread 250) to the content provider computing device 139 to obtain a content item related to the post-deadlock action. The content item can be provided by the content distribution system 110 or by the content provider computing device 139 to the client computing device 134 for rendering. The content item can indicate, for example, "Sorry to hear about the movie, would you like to order a car from a car share company?". The content selector component 125 (or other component such as the interface 123 or the direct action API 127) can block selection of the content item, or transmission of the selected content item to the client computing device 134, responsive to a deadlock condition or until release of the deadlock condition.

The direct action API 127 can modify sequential orders of actions indicated by the single thread 250. For example, the direct action API can determine an indication of a first sequential order, e.g., a first action, a second action subsequent to the first action, and a third action subsequent to the second action (dinner, then a movie, then a ride home). The direct action API 127 and other components such as the NLP component 122 and the interface 123 can receive a request to modify the sequential order. For example, the content distribution system 110 can receive in input audio signal from the client computing device of "OK I'd like to eat dinner after the movie." The direct action API 127 (or NLP component 122) can obtain from this audio input signal a request to modify the sequential order of the actions to, for example, a movie, then dinner, then a ride home. From this information, the direct action API 127 can generate a modified sequential order so that the second action (watching the movie) is now scheduled to occur prior to the first action (eating dinner). The direct action API 127 or content selector component 125 (or other components) can proceed accordingly to transmit data transmission of the movie action prior to data transmissions of the dinner action to the content provider computing device 139 or the service provider computing device 108. The direct action API 127 can also identify or modify a deadlock condition to delay operations related to the dinner action based on an end time of the first movie action. The actions of dinner, movies, and transport are examples and any number of end user activities or requests can constitute actions. The modifications can occur responsive to inputs other than the input audio signal. For example, if tickets to the 9 pm movie (after dinner) are sold out, the content distribution system 110 can provide an audio output for rendering at the client computing device 134 to suggest watching a movie (e.g., the 5 pm showing) prior to dinner.

The content distribution system 110 can perform offline action. This can save processing and electrical power requirements and reduce or shift network traffic to off-peak times. For example, the single thread 250 can indicate a first action and a second subsequent action that depends on resolution of the first action. These actions can be days or weeks (or more) apart from one another, such as buying a plane ticket (first action, today) for a three week tropical beach vacation that will occur six months in the future, and booking scuba lessons for the last day of the vacation (second action, more than six months away). The direct action API 127 can communicate in real time with the service provider computing device 108 corresponding to an airline entity responsive to receipt of the input audio signal to buy the plane tickets in an online action to effect a conversion—the purchase of the plane tickets. The second action in this example remains six months away. Over this six month period or other time window the direct action API 127 or other component such as the content selector component 125 can select content items or perform other operations responsive to the second action (scuba lessons). For example, the direct action API can obtain offline by obtaining this information from the data repository 129 or from a third party data repository relating to scuba lessons. The offline action may or may not be in real time, and an offline action does not require time separation (e.g., six months) between actions. For example, the content distribution system 110 can obtain information responsive to actions from the data repository 129 or from a third party database in a real time, as part of a communication session or synchronous or asynchronous conversation with the client computing device.

Figure 7:
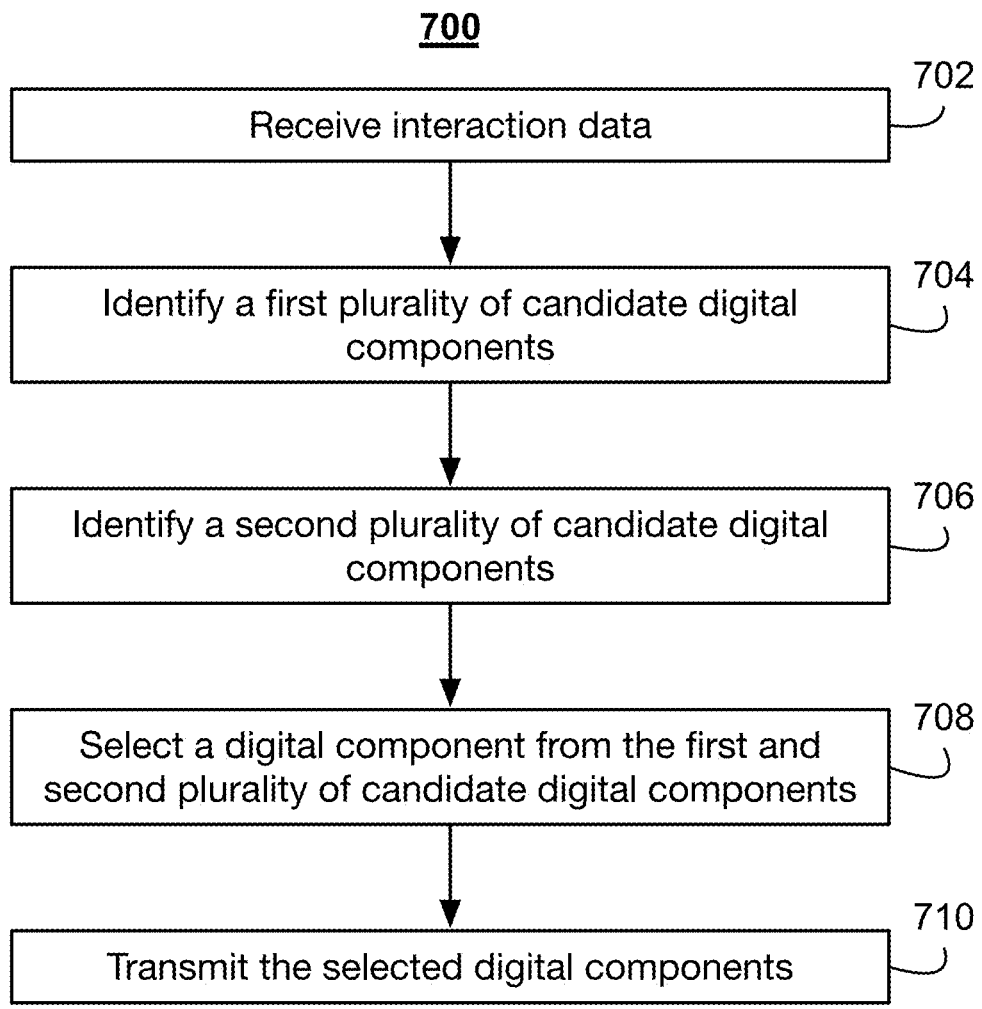
FIG. 7 illustrates a block diagram of an example method for selecting digital components.

FIG. 7 illustrates a block diagram of a method 700 for selecting digital components. The method 700 can include receiving interaction data (ACT 702). The method 700 can include identifying a first plurality of candidate digital components (ACT 704). The method 700 can include identifying a second plurality of candidate digital components (ACT 706). The method 700 can include selecting a digital component from the first plurality of candidate digital components and the second plurality of candidate digital component (ACT 708). The method 700 can include transmitting the digital component to the client device (ACT 710).

The method 700 can include receiving interaction data (ACT 702). In some implementations, the interaction data can be received by a data processing system from a client device. The interaction data can include a set identifier. The interaction data can also include an indication that the client device performed a pre-specified interaction with a script associated with the set identifier. The script can be a component of a content item previously presented to the client device.

The method 700 can include receiving, by a natural language processor and via an interface of the data processing system, data packets that can include a first input audio signal and a second input audio signal that were detected by a sensor of the client device. The natural language processor can parse the first and the second input audio signal to identify a first request and a first trigger keyword. The natural language processor can also parse the second input audio signal to identify a second request and a second trigger keyword.

For example, the content distribution system can execute, launch, or invoke the NLP component to receive packets or other protocol based transmissions via the network from at least one client computing device. The data packets can include or correspond to an input audio signal detected by the sensor (e.g., a microphone) of a first client computing device, such as a first end user saying "OK, I would like to go to go dinner tonight" into the client computing device, e.g., a smartphone. The NLP component can parse the input audio signal to identify requests (e.g., an entertainment request for "dinner") as well as trigger keywords ("to go to") that correspond or relate to the request. In some implementations, the method 700 can include generating at least one first action data structure based on the identified requests or keywords associated with the received first audio input signal. For example, the direct action API can generate an action data structure that indicates a first action, such as a location for a taxi pick-up, a requested service provider, or a restaurant recommendation.

The NLP component can also receive the second audio input signal. The NPL component can receive the audio input signal via a packet or other protocol based transmissions via the network. The second audio input signal can be received from the same or a different client computing device that originated the first input audio signal. The data packets can include or correspond to an input audio signal detected by the sensor of the second client computing device, such as an end user saying "OK, I would like to catch a movie later" into the client computing device. The data processing system can identify at least one second request or at least one second trigger keyword from the second input audio signal. For example, the NLP component can parse the input audio signal to identify requests (an entertainment request for a "movie") as well as trigger keywords ("to catch") that correspond or relate to the request. The data processing system can generate at least one second action data structure based on the identified requests or keywords associated with the received first audio input signal. For example, the direct action API can generate an action data structure that indicates a second action, such as a location for a taxi pick-up, a requested service provider, or movie information.

The method 700 can include identifying a first plurality of candidate digital components (ACT 704). The first plurality of candidate digital components can be identified by the data processing system. The data processing system can identify the first plurality of candidate digital components based on a first match between a query and a first keyword associated with the first plurality of digital components. For example, assume that the query submitted by the client device is "DVD player." In this example, a digital component can be selected as one of the candidate digital components based on the query "DVD player" matching a keyword (e.g., a targeting keyword) such as, for example, "DVD", "player", or "DVD player".

The method 700 can include identifying a second plurality of candidate digital components (ACT 706). The second plurality of candidate digital components can be identified based on a second match between the query, a second keyword associated with the second plurality of digital components, and the interaction data. For example, the second plurality of candidate digital components can be identified because the client device interacted with the script associated with the set identified (e.g., the client device previously performed the pre-specified action). The second plurality of candidate digital components can be identified in a method similar to the identification of the first plurality of candidate digital components. The second plurality of candidate digital components can be retargeted content items. The retargeted content items can be content items that are stored in association with the set identifier. The retargeted content items can be selected for a client device after the client device has performed the pre-specified interaction.

In some implementations, the method 700 can include determining that a first portion of the first plurality of candidate digital components is associated with a publisher and that a second portion of the second plurality of candidate digital components is also associated with. The publisher can be a content provider. The first portion of the first plurality of candidate digital components can be removed from the first plurality of candidate digital components prior to the selection of the digital component. For example, if a publisher has candidate digital components in the first plurality and the second plurality of candidate digital components that are both eligible for selection, the candidate digital component in the first plurality of candidate digital component can be removed to prevent the two digital components from competing in a selection process. Other techniques for selecting eligible content items from among multiple sets of content items that are provided by a same advertiser can also be used (e.g., selecting the set of advertisements having a higher bid or higher historical performance measure).

The method 700 can include selecting a digital component from the first plurality of candidate digital components and the second plurality of candidate digital components (ACT 708). The digital components can be selected from the first and second plurality of candidate digital components based on a performance metric of each of the candidate digital components in the first plurality of digital components and the second plurality of digital components. The performance metric can be a historical performance measure. In some implementations, the performance metric can include a bid value. The performance metric can be a function of one or more of the digital component's relevance to a current user interest (e.g., as determined by the relationship between the digital component and the input audio signal). The performance metric can be can be based on a relevance to a user type, relevance to a user, an offer per impression, an offer per user action (e.g., selection, conversion, etc.), a performance parameter of the digital component (e.g., selection rate, user rating, conversion rate, etc.), how the digital component performs (e.g., in terms of selection rate, conversion rate, etc.) on computing devices device configurations similar to the computing device. In some implementations, if the client device performed the pre-specified interaction, the performance metric can be weighted in the favor of the digital components in the second plurality of candidate digital components. For example, if the client device performed the pre-specified interaction, the digital processing system can be more likely to select the digital component from the second plurality of candidate digital components. For example, if a candidate digital component from the first plurality of candidate digital components has a conversion rate of 0.67 and a candidate digital component from the second plurality of candidate digital components has a conversion rate of 0.51, but a weighting of 2× because the client device performed the pre-specified interaction, the candidate digital component from the second plurality of digital components can be selected even though the unweighted conversion rate for the candidate digital component from the first plurality of candidate digital components is higher.

The method 700 can include identifying, by the direction action API, a deadlock condition associated with the second action. A deadlock condition can indicate that a second action cannot proceed until after a first, prior action is complete. For example, the direct action API can identify a deadlock condition when the first action is a movie action (watching a movie in a theater) and a second action is transport home via a car share service after the movie is over. The direct action API can determine a deadlock condition for the second action (e.g., the ride home) that lasts until a time associated with the first action, such as a scheduled end time of the movie. The direct action API or other component such as the interface can prevent transmission of the data transmission to a service provider computing device (e.g., a car share service) responsive to the deadlock condition. For example, the content distribution system or component thereof can prevent transmission of data packets of the data transmission (or data structure) for the action (e.g., to reserve a car) to a service provider computing device (e.g., of a car share service) during the time period of the deadlock condition. This prevents the service provider computing device from receiving the request for a car (or other service) too early.

The method 700 can include transmitting the digital component to a client device (ACT 710). In some implementations, the digital component can be transmitted to a second client device that is different from the client device that transmitted the input audio signal to the data processing system. The method can include transmitting the second action data structure to a second service provider device subsequent to receiving an indication of a completion of a first action associated with the first action data structure.

The data processing system can include a thread optimization component. The thread optimization component can determine a sequence dependency parameter. The sequence dependency parameter can be determined based on a heuristic technique applied to the first action data structure and the second action data structure. For example, the thread optimization component can apply a heuristic technique to data packets of a first data transmission (or to the corresponding first data structure) and to data packets of a second data transmission (or to the corresponding second data structure) to determine at least one sequence dependency parameter.

The heuristic or other statistical technique can determine or identify with a threshold degree of certainty patterns among the first and second data transmissions (or corresponding data structures) that indicate a sequence dependency of actions indicated by the data transmissions. The sequence dependency parameter can indicate the existence or likelihood (e.g., relative to a threshold level or other benchmark) of actions represented by the data transmissions (or corresponding action data structures) having an order of operations, time, or sequence dependency on each other. The sequence dependent operations or actions, indicated by the sequence dependency parameters, can include a number of actions that occur in a known, suggested, required, or particular order. For example, going from home to a movie theater, then back home can include three sequence dependent operations or actions. The first action in this example includes travelling from home to the movie theater. The second action includes watching the movie in the theater. The third action includes returning home from the theater.

The method 700 can include merging a transmission of the first action data structure and the second action data structure into a single thread. The data processing system can compare the sequence dependency parameter to a threshold (e.g., a rule, policy, or value) and based on the comparison the data processing system can merge the first and second data transmissions (or associated action data structures) into a single thread. The single thread can indicate actions of the first and second (or more) action data structures, and can indicate a sequence or order of these actions, as well as sequence dependencies where for example a second action cannot (or is not scheduled to) begin until after a first action is complete. In some implementations, the first action corresponds to the pre-specified interaction with the script and the second action includes the digital component.

Figure 8:
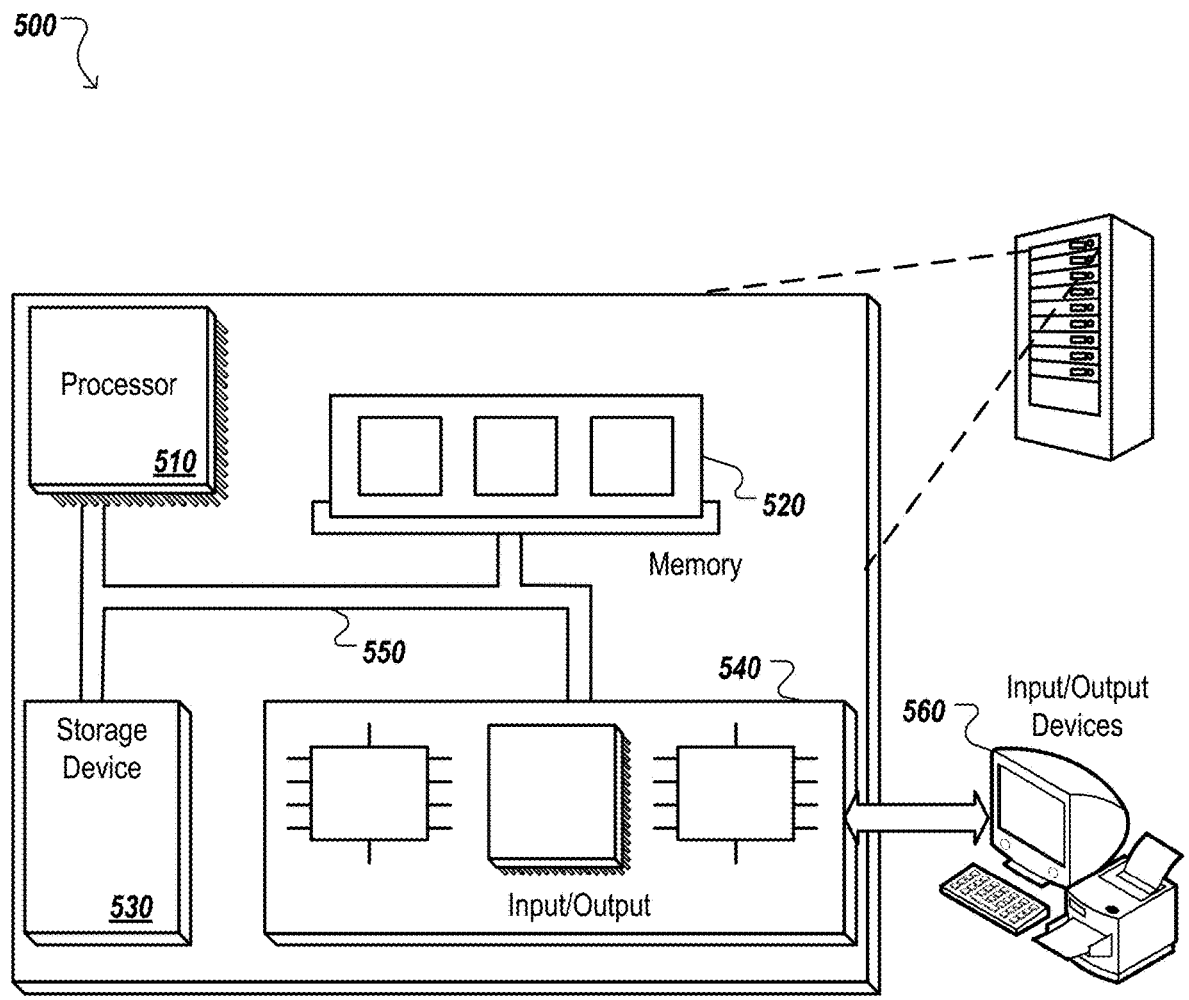
FIG. 8 is a block diagram of an example computer system.

FIG. 8 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system to select digital components comprising a data processing system having one or more processors to:
  receive, from a client device, interaction data including a set identifier that is associated with a query from the client device and an indication that the client device performed a pre-specified interaction with a script associated with the set identifier;
  identify a first plurality of candidate digital components based on a match between the query received from the client device and a first keyword associated with the first plurality of candidate digital components;
  identify, in response to a determination that a request for content received from the client device subsequent to the query includes a set identifier matching the set identifier included in the interaction data indicating that the client device performed the pre-specified interaction with the script, a second plurality of candidate digital components based on a match between the query, a second keyword associated with the second plurality of candidate digital components, and the set identifier of the interaction data;
  select a digital component from the first plurality of candidate digital components and the second plurality of candidate digital components based on a performance metric of each of the first plurality of candidate digital components and the second plurality of candidate digital components; and transmit, to the client device, the digital component to present via the client device in response to the request for content.

2. The system of claim 1, further comprising the data processing system having the one or more processor to:
determine a first portion of the first plurality of candidate digital components is associated with a publisher;
determine a second portion of the second plurality of candidate digital components is associated with the publisher; and
remove the first portion from the first plurality of candidate digital components.

3. The system of claim 1, further comprising a natural language processor to:
receive, via an interface of the data processing system, data packets comprising a first input audio signal detected by a sensor of the client device; and
receive, via the interface of the data processing system, data packets comprising a second input audio signal by the sensor of the client device.

4. The system of claim 3, wherein the natural language processor:
parse the first input audio signal to identify a first request and a first trigger keyword; and
parse the second input audio signal to identify a second request and a second trigger keyword.

5. The system of claim 4, further comprising a direct action application programming interface (API) to:
generate, based on the first trigger keyword and in response to the first request, a first action data structure; and
generate, based on the second trigger keyword and in response to the second request, a second action data structure.

6. The system of claim 5, further comprising a thread optimization component to:
determine, based on a heuristic technique applied to the first action data structure and the second action data structure, a sequence dependency parameter; and
merge, based on a comparison of the sequence dependency parameter with a threshold, a transmission of the first action data structure and the second action data structure into a single thread.

7. The system of claim 6, the direct action API to:
transmit the first action data structure to a first service provider device; and
transmit the second action data structure to a second service provider device subsequent to receiving an indication of a completion of a first action associated with the first action data structure.

8. The system of claim 6, wherein the single thread indicates a first action associated with the first action data structure scheduled to occur prior to a second action associated with the second action data structure.

9. The system of claim 8, wherein the first action associated with the first action data structure corresponds to the pre-specified interaction with the script and the second action associated with the second action data structure includes the digital component.

10. The system of claim 8, the direct action API to:
identify a deadlock condition associated with the second action.

11. A method for selecting digital components comprising:
receiving, by a data processing system from a client device, interaction data including a set identifier that is associated with a query from the client device and an indication that the client device performed a pre-specified interaction with a script associated with the set identifier;
identifying, by the data processing system, a first plurality of candidate digital components based on a match between the query received from the client device and a first keyword associated with the first plurality of candidate digital components;
identifying, by the data processing system, in response to a determination that a request for content received from the client device subsequent to the query includes a set identifier matching the set identifier included in the interaction data indicating that the client device performed the pre-specified interaction with the script, a second plurality of candidate digital components based on a match between the query, a second keyword associated with the second plurality of candidate digital components, and the set identifier of the interaction data;
selecting, by the data processing system, a digital component from the first plurality of candidate digital components and the second plurality of candidate digital components based on a performance metric of each the first plurality of candidate digital components and the second plurality of digital components; and
transmitting, by the data processing system to the client device, the digital component to present via the client device in response to the request for content.

12. The method of claim 11, further comprising:
determining, by the data processing system, a first portion of the first plurality of candidate digital components is associated with the a publisher;
determining, by the data processing system, a second portion of the second plurality of candidate digital components is associated with the publisher; and
removing, by the data processing system, the first portion from the first plurality of candidate digital components.

13. The method of claim 11, further comprising:
receiving, by a natural language processor and via an interface of the data processing system, data packets comprising a first input audio signal detected by a sensor of the client device; and
receiving, by the natural language processor via the interface of the data processing system, data packets comprising a second input audio signal by the sensor of the client device.

14. The method of claim 13, further comprising:
parsing, by the natural language processor, the first input audio signal to identify a first request and a first trigger keyword; and
parsing, by the natural language processor, the second input audio signal to identify a second request and a second trigger keyword.

15. The method of claim 14, further comprising:
generating, by a direct action API and based on the first trigger keyword and in response to the first request, a first action data structure; and
generating, by the direct action API and based on the second trigger keyword and in response to the second request, a second action data structure.

16. The method of claim 15, further comprising:
determining, by a thread optimization component and based on a heuristic technique applied to the first action data structure and the second action data structure, a sequence dependency parameter; and
merging, by the thread optimization component and based on a comparison of the sequence dependency parameter with a threshold, a transmission of the first action data structure and the second action data structure into a single thread.

17. The method of claim 16, further comprising:
transmitting the first action data structure to a first service provider device; and
transmitting the second action data structure to a second service provider device subsequent to receiving an indication of a completion of a first action associated with the first action data structure.

18. The method of claim 16, wherein the single thread indicates a first action associated with the first action data structure scheduled to occur prior to a second action associated with the second action data structure.

19. The method of claim 18, wherein the first action associated with the first action data structure corresponds to the pre-specified interaction with the script and the second action associated with the second action data structure includes the digital component.

20. The method of claim 18, further comprising:
identifying, by the direct action API, a deadlock condition associated with the second action.

\* \* \* \* \*